(12) United States Patent
Maiwand et al.

(10) Patent No.: US 9,902,368 B2
(45) Date of Patent: Feb. 27, 2018

(54) APPARATUS, SYSTEM AND METHOD FOR VEHICLE ACCESS AND FUNCTION CONTROL UTILIZING A PORTABLE DEVICE

(71) Applicants: VOLKSWAGEN AKTIENGESELLSCHAFT, Wolfsburg (DE); AUDI AG, Ingolstadt (DE)

(72) Inventors: Heiko Maiwand, San Jose, CA (US); Martin Roehder, Ingolstadt (DE); Payton White, Foster City, CA (US); Jaime Camhi, San Jose, CA (US)

(73) Assignees: Volkswagen Aktiengesellschaft, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 15/693,421

(22) Filed: Aug. 31, 2017

(65) Prior Publication Data

US 2018/0009416 A1 Jan. 11, 2018

Related U.S. Application Data

(63) Continuation-in-part of application No. 15/261,857, filed on Sep. 9, 2016, which is a continuation-in-part of application No. 15/173,498, filed on Jun. 3, 2016.

(51) Int. Cl.
*B60R 25/24* (2013.01)
*G07C 9/00* (2006.01)
*B60R 25/20* (2013.01)

(52) U.S. Cl.
CPC .......... *B60R 25/24* (2013.01); *B60R 25/2081* (2013.01); *B60R 2325/20* (2013.01)

(58) Field of Classification Search
CPC . B60R 25/24; B60R 25/2081; B60R 2325/20; G07C 9/00896; G07C 9/00182; G07C 2009/00984
USPC .................................................. 340/5.61–5.66
See application file for complete search history.

(56) References Cited

U.S. PATENT DOCUMENTS

| | | | |
|---|---|---|---|
| 9,569,948 B1 | 2/2017 | Platt | |
| 2005/0116024 A1* | 6/2005 | Beenau | G06Q 20/00 235/380 |
| 2013/0013414 A1 | 1/2013 | Haff | |
| 2013/0099892 A1 | 4/2013 | Tucker | |
| 2015/0049033 A1 | 2/2015 | Kim et al. | |

(Continued)

*Primary Examiner* — Allen T Cao
(74) *Attorney, Agent, or Firm* — Loza & Loza, LLP; Peter Zura

(57) ABSTRACT

A system for providing dynamic access to a vehicle via a plurality of devices. A device and/or a server of an authentication network stored fob data relating to one or more key fobs linked to the vehicle, and device data that includes data relating to one or more devices linked to the key fob that are authorized to access the vehicle. The vehicle receives an access request indicating that a new device is requesting access to the vehicle, whereupon a challenge may be transmitted to one or more of the authorized devices. The one or more devices may respond, granting access to vehicle functions. The vehicle and/or authentication network generate a secure fob key and access limitations based on the response and transmit the secure fob key to the new device. Profile templates may be used to set and control vehicle access and functions.

20 Claims, 20 Drawing Sheets

(56) References Cited

U.S. PATENT DOCUMENTS

| | | |
|---|---|---|
| 2015/0234985 A1* | 8/2015 | Saunders .............. G06F 19/323 |
| | | 705/3 |
| 2015/0235488 A1* | 8/2015 | Proefke .............. G07C 9/00007 |
| | | 340/5.61 |
| 2015/0239357 A1 | 8/2015 | Huntzicker |
| 2015/0356797 A1 | 12/2015 | McBride |
| 2015/0379790 A1 | 12/2015 | Hatton |
| 2016/0049033 A1 | 2/2016 | Sigal |
| 2016/0200250 A1 | 7/2016 | Westmoreland |

\* cited by examiner

| 1000 | Vehicle_1 | Vehicle_2 |
|---|---|---|
| Authorized Users | User_1 | User_1, User_2, User_3 |
| Authorized FOB | FOB_A | FOB_B |

FIG. 10

| 1100 | User_1 | User_2 | User_3 |
|---|---|---|---|
| Device ID | Dev_1 | Dev_2 | Dev_3 |
| Password | Pass_1 | Pass_2 | Pass_3 |
| Trusted FOB(s) | FOB_A | --- | FOB_B |

FIG. 11A

| 1102 | User_1 | User_2 | User_3 |
|---|---|---|---|
| Device ID | Dev_1 | Dev_2 | Dev_3 |
| Password | Pass_1 | Pass_2 | Pass_3 |
| Trusted FOB(s) | FOB_A (Dev_1) | --- | FOB_B (Dev_3) |

FIG. 11B

APPARATUS, SYSTEM AND METHOD FOR VEHICLE ACCESS AND FUNCTION CONTROL UTILIZING A PORTABLE DEVICE

RELATED APPLICATIONS

The present application is a continuation-in-part of U.S. patent application Ser. No. 15/261,857 to Maiwand, et al., titled "Apparatus, System and Method for Vehicle Access and Function Control Utilizing a Portable Device", filed Sep. 9, 2016, which is a continuation-in-part of U.S. patent application Ser. No. 15/173,498 to Maiwand, et al., titled "Apparatus, System and Method for Dynamic Identification for Vehicle Access," filed Jun. 3, 2016, the content of which are incorporated by reference in their entirety herein.

FIELD OF TECHNOLOGY

The present disclosure is directed to vehicle security and access. More specifically, the present disclosure is directed to authenticating and/or authorizing users and dynamically identifying authorized users for one or more vehicles to allow access to vehicle functions such as door locks, ignition and the like. Additionally, the present disclosure is directed to providing customizable access and control of vehicle functions for authorized users.

BACKGROUND

A keyless entry system is an electronic lock that controls access to a building or vehicle without using a traditional mechanical key. The term keyless entry system originally meant a lock controlled by a keypad located at or near the driver's door, that required pressing a predetermined (or self-programmed) numeric code for entry. The term remote keyless system (RKS), also called keyless entry or remote central locking, refers to a lock that uses an electronic remote control as a key which is activated by a handheld device or automatically by proximity. Widely used in automobiles, an RKS performs the functions of a standard car key without physical contact. When within a few yards of the car, pressing a button on the remote can lock or unlock the doors, and may perform other functions. A remote keyless system can include both a remote keyless entry system (RKE), which unlocks the doors, and a remote keyless ignition system (RKI), which starts the engine.

Keyless remotes contain a short-range radio transmitter, and must be within a certain range, usually 5-20 meters, of the car to work. When a button is pushed, it sends a coded signal by radio waves to a receiver unit in the car, which locks or unlocks the door. Most RKEs operate at a frequency of 315 MHz for North America-made cars and at 433.92 MHz for European, Japanese and Asian cars. Modern systems implement encryption to prevent car thieves from intercepting and spoofing the signal. The functions of a remote keyless entry system are contained on a key fob or built into the ignition key handle itself. Buttons are dedicated to locking or unlocking the doors and opening the trunk or tailgate. On some vehicles, such as minivans, power sliding doors can be opened/closed remotely. Some cars will also close any open windows and roof when remotely locking the car. Some remote keyless fobs also feature a red panic button which activates the car alarm as a standard feature. Further adding to the convenience, some cars' engines with remote keyless ignition systems can be started by the push of a button on the key fob, and convertible tops can be raised and lowered from outside the vehicle while it's parked. On cars where the trunk release is electronically operated, it can be triggered to open by a button on the remote. Conventionally, the trunk springs open with the help of hydraulic struts or torsion springs, and thereafter may be lowered manually. In other configurations, trunks or tailgates may have a motorized assist that can both open and close the tailgate for easy access and remote operation.

A smart key is an electronic access and authorization system that allows the driver to keep the key fob pocketed when unlocking, locking and starting the vehicle. The key is identified via one of several antennas in a car's bodywork and a radio pulse generator in the key housing. Depending on the system, the vehicle is automatically unlocked when a button or sensor on the door handle or trunk release is pressed. Vehicles with a smart key system may be fitted with a mechanical backup, usually in the form of a spare key blade supplied with the vehicle.

Currently, vehicle access systems are relatively inflexible, in that they typically limit access only to users in physical possession of a key fob specific to one vehicle. Most configurations do not have effective means in which grant access to individuals based on dynamic permissions, while retaining the security and convenience of a key fob. Technologies and techniques are needed to provide dynamic user access, among a plurality of users via secure communications while providing a positive user experience for access through passive keyless entry (PKE) and other similar devices. Furthermore, technologies and techniques are needed to provide customizable vehicle access and function control.

SUMMARY

Various apparatus, systems and methods are disclosed herein relating to vehicle security and the dynamic granting of access to vehicle functions via a plurality of devices.

In some illustrative embodiments, a system for authorizing access to vehicle functions for a vehicle is disclosed. The system may include a processor; data storage, operatively coupled to the processor, the data storage configured to store (i) fob data relating to a key fob linked to the vehicle, (ii) device data comprising data relating to one or more devices linked to the key fob that are authorized to access the vehicle, and (iii) vehicle access and/or function control data; and communications circuitry, operatively coupled to the processor, the communications circuitry configured to communicate with a new device is requesting access to the vehicle. The processor may be configured to generate a secure fob key for authenticating the new device based on the fob data and the device data, and wherein the processor may be configured to generate a vehicle function control file based on (i) the vehicle access and/or function control data and (ii) the secure fob key, wherein the vehicle function control file is associated with a profile template configured to control access of the new device to the vehicle and control at least one operational function of the vehicle.

In some illustrative embodiments, a method for authorizing access to vehicle functions for a vehicle is disclosed. The method may comprise the steps of receiving, in a storage, fob data relating to a key fob linked to the vehicle; receiving, in the storage, device data comprising data relating to one or more devices linked to the key fob that are authorized to access the vehicle; receiving, in the storage, a profile template comprising vehicle access and/or function control data; establishing communications, via communications circuitry, with a new device that is requesting access to the vehicle;

generating, via a processor, a secure fob key based on the fob data and the device data; and generating, via the processor, a vehicle function control file based on the profile template and the secure fob key, wherein the vehicle function control file is configured to control access of the new device to the vehicle and control at least one operational function of the vehicle.

In some illustrative embodiments, a vehicle for authorizing access for vehicle functions for a new device is disclosed. The vehicle may comprise a processor; data storage, operatively coupled to the processor, the data storage configured to store (i) fob data relating to a key fob linked to the vehicle, (ii) device data comprising data relating to one or more devices linked to the key fob that are authorized to access the vehicle, and (iii) vehicle access and/or function control data. The vehicle may also include communications circuitry, operatively coupled to the processor, the communications circuitry configured to communicate with a new device is requesting access to the vehicle to receive a vehicle function control file comprising a secure fob key and a profile template defining vehicle access and/or function control data. THe processor may be configured to authenticate the new device via the secure fob key, and, based on the authentication, apply a profile template associated with the secure fob key to a vehicle subsystem to at least one of (i) limit access of the new device to the vehicle, (ii) limit an operational function of the vehicle, and (iii) provide alerts for the vehicle based on the vehicle access and/or function control data.

BRIEF DESCRIPTION OF THE FIGURES

The present invention is illustrated by way of example and not limitation in the figures of the accompanying drawings, in which like references indicate similar elements and in which:

FIG. 10 shows an example of an authorization table that indicates authorized users and fobs for a plurality of vehicles under an illustrative embodiment;

FIG. 11A shows an example of an authorization table for a plurality of users where device identification (ID) data, passwords and/or trusted fobs are registered for vehicle access under an illustrative embodiment;

FIG. 11B shows an example of an authorization table for a plurality of users where device identification (ID) data, passwords and/or trusted fobs, together with paired fobs and devices for specific users, are registered for vehicle access under an illustrative embodiment;

DETAILED DESCRIPTION

Various embodiments will be described herein below with reference to the accompanying drawings. In the following description, well-known functions or constructions are not described in detail since they may obscure the invention in unnecessary detail.

It will be understood that the structural and algorithmic embodiments as used herein does not limit the functionality to particular structures or algorithms, but may include any number of software and/or hardware components. In general, a computer program product in accordance with one embodiment comprises a tangible computer usable medium (e.g., hard drive, standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via Scala Programming Language (Scala), C, C++, C#, Java, Actionscript, Objective-C, Javascript, CSS, XML, etc.). Furthermore, the term "information" as used herein is to be understood as meaning digital information and/or digital data, and that the term "information" and "data" are to be interpreted as synonymous.

Figure 1:
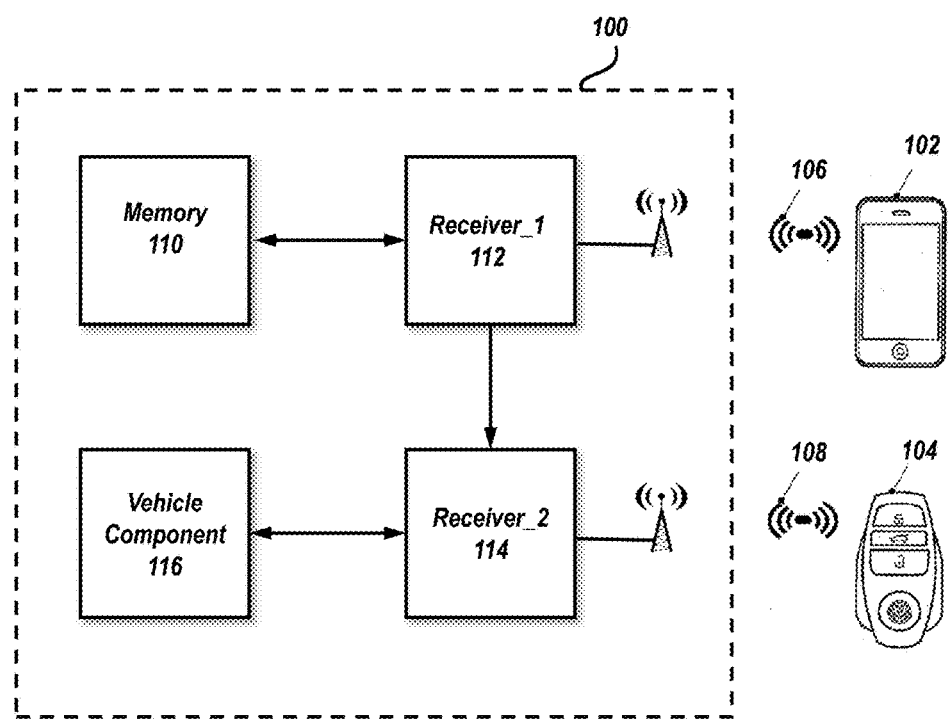
FIG. 1 illustrates a systematic overview of a vehicle system to provide access to a vehicle including a plurality of receivers to activate one or more vehicle functions.

Turning to FIG. 1, a vehicle 200 may comprise a vehicle system 100 for activating at least one vehicle component 116. A vehicle component 116 can be any component at the vehicle that can be activated by at least another component inside or outside the vehicle 200. Further details of this configuration may be found in U.S. patent application Ser. No. 14/065,996 to Akay, et al., titled "Vehicle System for Activating a Vehicle Component," filed Oct. 29, 2013, the contents of which are incorporated by reference in their entirety herein. The vehicle component 116 may be activated electrically either directly or indirectly through other components, for example, by components operative to switch or regulate electronic current or voltage, such as, but not limited to, mechanical or solid-state relays, semiconductor switches (silicon controlled rectifiers, transistors, MOSFET, CMOS devices, Insulated Gate Bipolar Transistors (IGBT) etc.). As an example, by receiving a specific wireless signal by a vehicle receiver the vehicle fuel filler door may be unlocked or mechanically opened by driving a motorized mechanism to open the fuel filler door. After receiving the signal there might be various electronic circuits, e.g. for decrypting the received signal, verifying the signal, interpreting the signal, transferring and providing a signal for performing a vehicle function including, but not limited to, starting an engine, activating one or more lights, and/or driving an electric motor that is coupled to a door mechanism operable to open a door. This signal processing procedure may apply to any other vehicle component 116 as well.

FIG. 1 provides a systematic overview of a vehicle system 100 including a first and second receiver 112, 114 to activate a vehicle component 116 or function. In one example, a vehicle user is approaching a vehicle 200 with at least one electronic device 102 and a matching vehicle access key 104. The electronic device 102 is able to send out a wireless signal 106 to communicate with the first receiver 112 if the electronic device 102 is in a reception range (204) of the first receiver or other suitable signal. In certain illustrative embodiments, this signal can be a Bluetooth low energy signal or other suitable signal. Bluetooth low energy is specifically designed to draw very low amounts of power and therefore these sending and receiving devices are very energy efficient. Especially when used in a vehicle (e.g., 200), these devices can receive wireless signals 106 for a long time without the need to be shut down due to their quiescent current demand when the vehicle 200 is parked. In certain illustrative embodiments, when the user approaches the vehicle 200, the first receiver 112 obtains a wireless signal 106 from the electronic device 102, when the device 102 is in the reception range (204) of the first receiver 112.

The wireless signal 106 of the electronic device 102 may comprise first identification data. This identification data may comprise a Unique Device Identifier (UDID), an Android ID, an international mobile equipment identity (IMEI), an international mobile subscriber identity (IMSI), and/or a user-created ID that resides on device (e.g., 102) memory and/or firmware. In one embodiment, the identification data comprises an identification code so that the vehicle system 100 can verify that a specific vehicle user carrying the electronic device 102 is in the reception range 204. The vehicle system 100 comprises a memory 110 or memory device in which second identification data is stored. The memory 110 is able to store more than one set of second identification data, including a reference identification data for authentication. This is beneficial in the case when more than one user uses the vehicle 200. By storing multiple sets of identification data the vehicle 200 is able to distinguish between the users and their preferences if the users each use a different set of first identification data. The identification data can also be dynamically generated and dynamically checked according to a predefined method to provide a higher level of safety when accessing the vehicle 200. The identification data can also be encrypted by the electronic device 102 and decrypted by the vehicle system 100.

If the first identification data match the at least second (reference) identification data stored in the memory 110, the first receiver 112 may send a control signal to the second receiver 114 to access a matching vehicle access key 104 by a wireless signal 108. If the second receiver 114 correctly identifies the vehicle key as a matching vehicle access key 104, at least one vehicle component 116 is activated or operated. Vehicle components 116 include but are not limited to an ignition system, immobilizer, a central locking system, a vehicle door, a vehicle trunk lid, an automatic tailgate, a fuel filler door, an electrical charging port door release, an electrical charging plug release, a window opener, a sunroof, a convertible roof system, a vehicle infotainment system, a navigation system, a radio system, a climate control, a seat or mirror adjustment, a steering wheel adjustment, a pedal adjustment, an exterior or interior vehicle light, a driver assistance system or a vehicle camera. In certain illustrative embodiments, a vehicle user can also activate at least one vehicle component 116 by directly sending the wireless signal 108 from the matching vehicle access key 104. In certain keyless vehicle entry systems, for example, as described in EP 1726753 B1, that, upon touching a vehicle door handle, capacitive sensors may detect such contact, and a keyless entry system may be activated and a receiver may detect the presence of a matching vehicle access key 104.

In the example of FIG. 1, the user interaction in vehicle system 100 may be advantageously more simplified. Not only can the central door locking system be activated at an earlier stage without the need of the user to touch a sensor but also the whole vehicle 200 or selected vehicle components 116 can be activated earlier. If the user does not have to touch a vehicle sensor to open the vehicle this is especially helpful if he is carrying something and returns to the vehicle. In this situation, the vehicle can additionally open the automatic tailgate.

Figure 2:
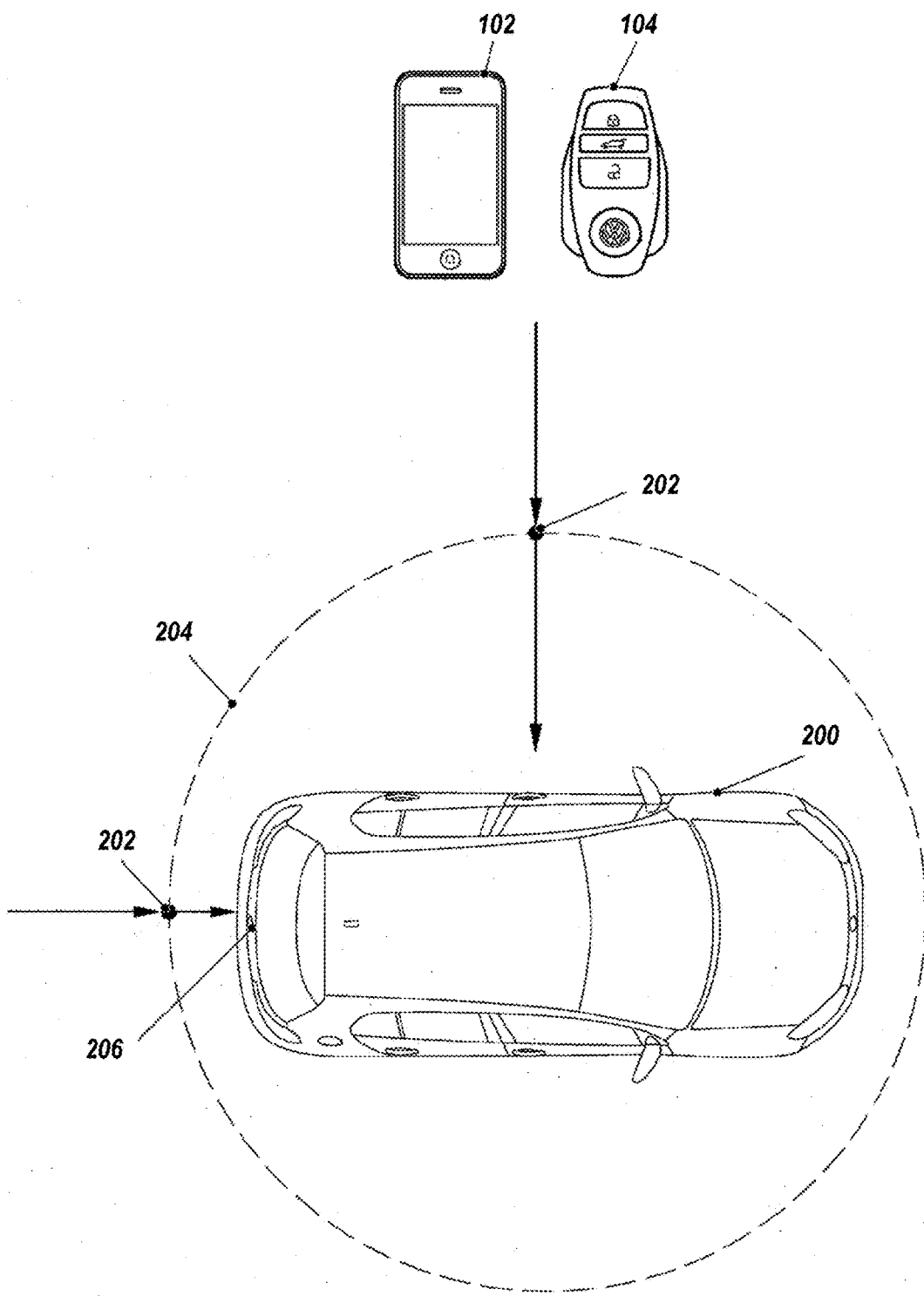
FIG. 2 schematically illustrates an approach of a vehicle user to a vehicle from different directions carrying an electronic device and a vehicle key.

FIG. 2 schematically illustrates an approach of a vehicle user to a vehicle 200 from a plurality of directions carrying an electronic device 102 as well as a vehicle access key 104 according to an illustrative embodiment. In a first example, the vehicle user is approaching the vehicle 200 from the rear. A dashed circle 204 schematically represents the reception range 204 of the first receiver 112. At position 202 the vehicle user enters the reception range 204 of the first receiver 112. The first identification data of the electronic device 102 can now be received by the first receiver 112. If positively verified, the first receiver 112 wakes up the second receiver 114 and checks for a matching vehicle access key 104. If the matching vehicle access key 104 is detected, all vehicle doors are unlocked.

In another embodiment, the electronic device 102 stores the parking position and heading of the vehicle 200. In this example the electronic device 102 is a smartphone with a global positioning system (GPS), along with motion or acceleration sensors. When the user now approaches the vehicle 200, the electronic device 102 or a computer executable program on a server can determine the current position of the smart phone and the direction the user is approaching the vehicle position. If the user approaches the vehicle from the rear and enters the reception range 204 at point 202, the smart phone and the first receiver 112 start communicating with each other. The smart phone is identified as a device that has been successfully paired to exchange first identification data with the vehicle 200. Since the user is approaching the vehicle 200 from the rear, a vehicle control command to activate a rear view camera 206 is sent to the vehicle 200. The user stops in front of the trunk lid and an image recognition within the vehicle 200 is able to identify a person in an image or a video stream taken by the rear view camera 620. The vehicle system 100 notices that the user is waiting, for example more than a predefined time, e.g. more than 2 seconds, in the rear of the vehicle 200 and subsequently opens the trunk lid and activates an automatic trunk lid opener.

In another example, the user enters the reception range 204 at a location 208 on the driver's side of the vehicle 200. The electronic device 102 or a remote server program analyses the GPS or motion data of the electronic device 102 and compares that to the direction and position of the vehicle 200. It is determined, that the user is approaching the vehicle 200 from the driver's side and subsequently unlocks the door on the driver's side.

Figure 3:
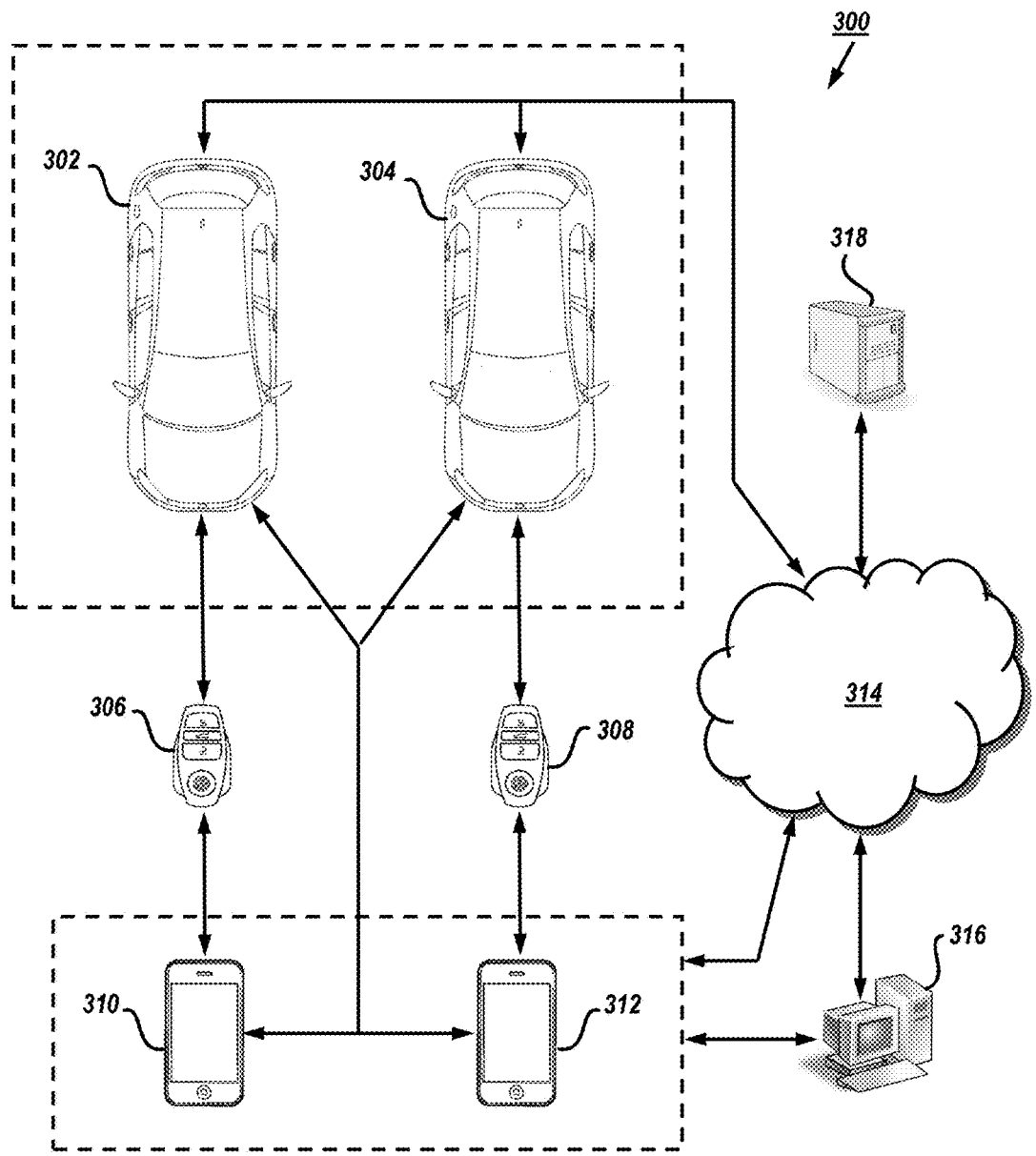
FIG. 3 is an exemplary system illustrating vehicles paired with one or more portable devices and/or key fobs, wherein the portable devices are configured to communicate with a vehicle, a local computer and network for receiving and sending data and/or instructions under an embodiment.

FIG. 3 discloses an exemplary embodiment of a vehicle authentication system 300, in which vehicles (302, 304) and their respective key fobs (306, 308) are paired or linked with respective portable devices (310, 312), which may be configured to communicate with a local computer 316 as well as directly via wireless communication to authentication network 314, which may comprise one or more servers 318. As will be discussed in further detail below, "key fobs" may be distinguished from "fob keys" in that key fobs are specifically-designed hardware devices that are configured to operate exclusively or primarily with dedicated vehicle communications. In contrast, fob keys are dedicated software components or modules that may be implemented on key fobs, and also on general-purpose processing devices (e.g., smart phone) as well. Servers 318 may comprise wired and/or wireless communication interfaces to receive vehicle data, portable device data and other data from portable devices 310, 312 as well as vehicles 302, 304. Additional data or instructions from computer 316 may be received via wired or wireless interface through network 314. While not explicitly shown in FIG. 3, servers 318 further comprise processors, storage and other peripheral devices known in the art to enable data processing and communication. For the purposes of the present disclosure, portable devices 310, 312 may include any portable computing device capable of providing data communication over a wireless medium, including, but not limited to, a cellular phone, smart phone, tablet, laptop or PDA.

In the example of FIG. 3, vehicle 302 is linked to key fob 306, which may be configured to open or start vehicle 302. Key fob 302 may additionally be equipped with buttons (which may be luminous), other lights, and/or a keypad. Vehicle 302 may also be configured to be independently linked or paired with portable device 310 (i.e., without requiring an initial direct linking with a key fob), belonging to a first user. After being paired with vehicle 302 (discussed in greater detail below in FIG. 9), portable device 310 will be able to receive and transmit data and/or instructions to vehicle 302. The pairing of device 310 with vehicle 302 may be accomplished using any of a number of wireless communication protocols, including IEEE 802.15.4, Bluetooth, Wi-Fi, and NFC. In one exemplary embodiment, portable device 310 may also be linked with key fob 306 to provide a path for wireless data communication as well.

Vehicle 304 is linked to key fob 308 and device 312 belonging to a second user, similarly as described above. In this example, vehicles 302 and 304 may each be considered part of authenticated group 330, 340 linked to users of portable devices 310, 312, which may be family members, co-workers, drive-share groups and the like. Once registered as such (discussed in greater detail in FIG. 9 below), devices 310, 312 may exchange data and/or instructions with each other (indicated by connecting arrow in FIG. 3), as well as vehicles 302, 304 of the authenticated group. Thus, in one example, portable device 310 would be configured to communicate with vehicles 302 and 304 as well as portable device 312, while portable device 312 would similarly be configured to communicate with vehicle 304 and 302, as well as portable device 310. This embodiment may be advantageously used to allow multiple members to communicate with and/or control multiple vehicles within their authentication group, and further allowing data to be communicated to or from portable devices in a group 101 independently, in parallel, or in a "daisy-chain" fashion. Furthermore, as will be described in greater detail below, one authenticated device 310, may be used to provide authentication to one or more other devices (e.g., 312). In certain illustrative embodiments, computer 316 may be used to authenticate and/or manage authentication of registered devices (e.g., 310, 312).

Portable devices 310, 312 may also be communicatively coupled to local computer 316, which may be located at a user's home, place of work, etc. Local computer 316 may be a personal computer, laptop, or any other computing device capable of performing processing operations as well as sending and receiving data communication. In one embodiment, portable devices 310, 312 communicates with local computer 316 wirelessly. In another embodiment portable devices 310, 312 communicate with local computer 316 via a wired connection, which may include a dock or docking station (not shown). Local computer 316 may be suitably equipped with software allowing computer 316 to communicate with authentication network 314, which may include one or more servers 318. In one embodiment, local computer 316 communicates to authentication network 314 via HTTP over TCP/IP using a web browser interface using Java, JavaScript, DHTML, HTML5, Flash, Silverlight or any other suitable language or platform.

Portable devices 310, 312 may also be configured to directly communicate with authentication network 314 via wireless and/or cellular connection as shown in FIG. 3 utilizing an on-device software application (or "app"), or through a web-based or mobile browser. In another exemplary embodiment, vehicles 302, 304 may be equipped with wireless communication to enable vehicles 302, 304 to also communicate wirelessly with authentication network 314, similar to portable devices 310, 312.

In certain illustrative embodiments, vehicle authentication system 300 is configured to provide two-step or multi-step authentication for allowing entry and/or operation of vehicles 302 and/or 304. Two-step authentication (also known as two-step verification) is a process involving two or more stages to verify the identity of an entity trying to access a vehicle. Generally speaking, the process involves multi-factor authentication which involves the presentation of two or more of three authentication factors: a possession factor, a knowledge factor and an inheritance factor. When accessing a vehicle, system 300 may execute a form of two-step verification. To determine who the individual is when accessing vehicle 302, system may require the detection of a key fob 306 to show the individual has possession of a required item. In one embodiment, the system may alternately, or in addition, require the presence ("possession") of portable device 310 that is registered in the system. To further verify that the individual is authorized to access vehicle 302, the individual may be required to enter a personal identification number (PIN) ("knowledge factor") on a door lock keypad on the surface of the vehicle door. In one embodiment, the individual may be required to enter a PIN on the portable device 310, which is then communicated to vehicle 302 and/or authentication network 314. In another embodiment, the individual may be required to physically press a button or series of buttons on key fob 306 for entering a PIN or authentication input. In a further embodiment, the vehicle may automatically receive secured device identification data (e.g., IMEI, IMSI) for authentication purposes. In one embodiment, inheritance factors may be utilized via the portable device 310 utilizing fingerprint or voice recognition embodied on the device itself.

Figure 4:
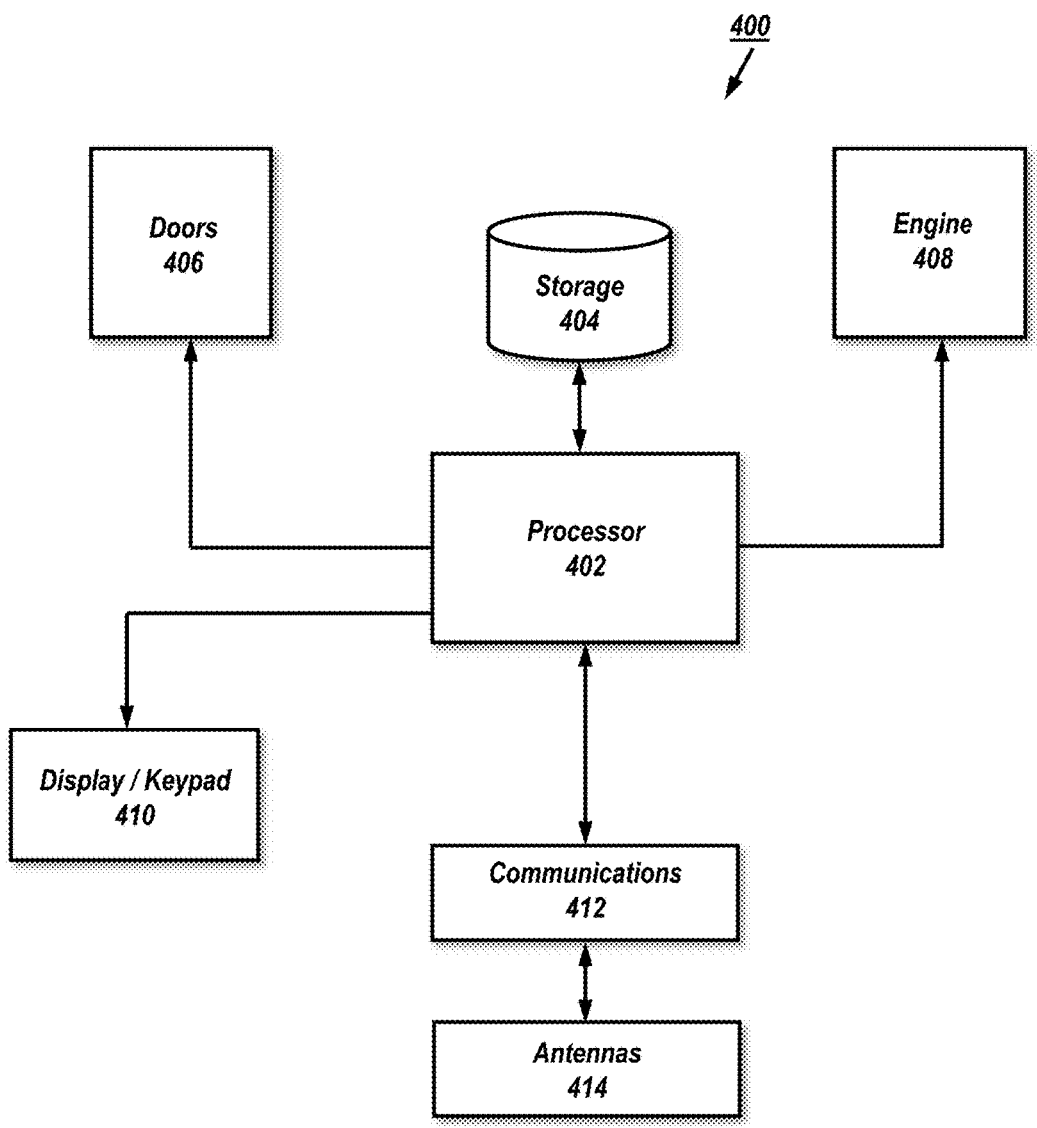
FIG. 4 is an exemplary block diagram illustrating hardware components in a vehicle's electronics system, where a processor communicates and controls operation of door entry and ignition of a vehicle, and includes communications to send and receive data and/or instructions to the vehicle under an embodiment.

Turning to FIG. 4, an exemplary embodiment is provided illustrating components within a vehicle (302-304) for authentication, which may be incorporated into the embodiment of FIG. 1, or may be configured as a stand-alone system. Processor 402 is responsible for operating and controlling doors 202 and associated locking mechanisms, as well as engine 408 operations and control. In one embodiment, processor 402 may be a stand-alone processor that communicates and controls a body controller in the vehicle to lock and unlock the doors 406, and further communicates with an immobilizer or engine control unit (ECU) for controlling operation of the vehicle. In another embodiment, processor 402 may be two or more processors performing the same functions. In this example, the processors may be distributed among different units in the vehicle. The immobilizer may be embodied as static codes or rolling codes in a key fob or portable device that are recognized by an RFID loop around the lock barrel and checked against the vehicle's ECU for a match. If the code is not recognized, the ECU will not allow fuel to flow and ignition to take place. A circuit inside the key fob or portable device is activated by a small electromagnetic field which induces current to flow, which in turn broadcasts a unique binary code which is read by the vehicle's ECU. When the ECU determines that the coded key is both current and valid, the ECU activates the fuel-injection sequence.

Processor 402 is communicatively coupled to communications 412, which may comprise one or more communication interfaces and associated circuitry for sending and receiving data and/or instructions from one or more portable devices and/or an authentication network. Communications 412 may include wired interfaces, such as USB or Firewire, as well as wireless interfaces, such as Bluetooth, Wi-Fi or cellular communication. Antennas 414 may comprise one or more antennas for detecting the presence of key fobs (e.g., 304, 308) and/or portable devices (e.g., 310, 312), and may be equipped with sensor technology (e.g., proximity sensors) for detecting a physical presence of a user. Antennas 414 may be integrated with communications 412, or may be configured as a stand-alone system. Processor 402 is also coupled to storage 404 that may be configured to store software for executing authentication described herein, and also store data generated and/or received for authentication processing. Display/keypad 410 may be further provided to display information from processor 402 and to provide data entry capabilities for a user. The keypad may comprise a physical keypad, or may alternately be configured as a virtual keypad within the display as is known in the art.

Figure 5:
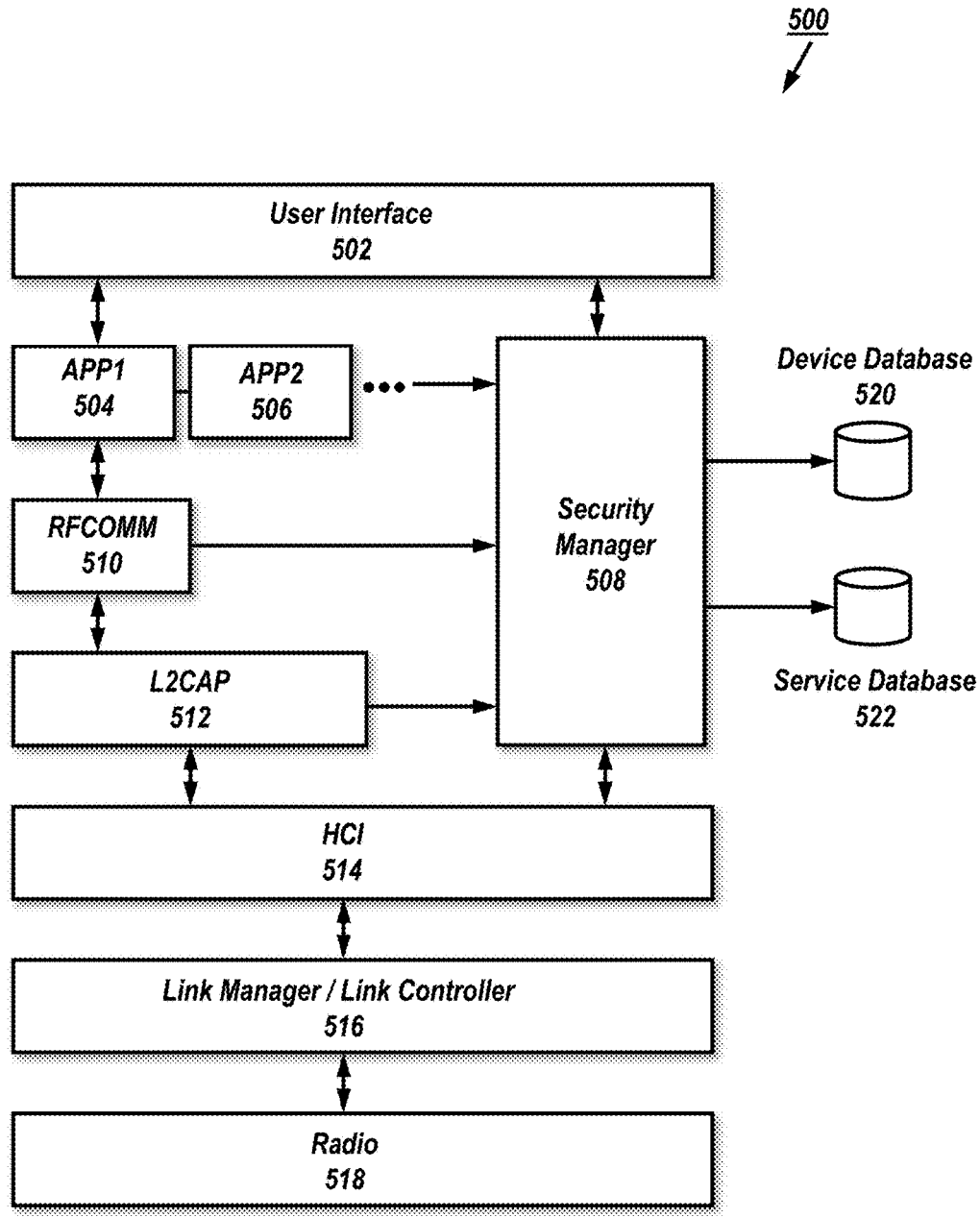
FIG. 5 is an exemplary illustration of a wireless pairing/bonding configuration that further includes protocols for securely pairing/bonding devices and vehicles under an embodiment.

Turning now to FIG. 5, the figure illustrates an exemplary configuration 500 for communication among portable device(s) 310, 312 and vehicle 302, 304 utilizing a Bluetooth protocol. The configuration is particularly useful for pairing and bonding portable devices to vehicles (e.g., 302, 304) and to each other. Generally speaking, two entities (e.g., device-device; device-vehicle) may become paired when they start with the same PIN and generate the same link key, and then use this key for authenticating at least a present communication session. The session can exist for the life of a L2 CAP link or the life of an ACL link. Pairing can occur through an automatic authentication process if both devices already have the same stored PIN from which they can derive the same link keys for authentication. Alternatively, either or both applications can ask their respective users for manual PIN entry. Once entities are paired they can either store their link keys for use in subsequent authentications or discard them and repeat the pairing process each time they connect. If the link keys are stored, then the devices are bonded, enabling future authentications to occur using the same link keys and without requiring the user to input the PIN again. Bonding can expire immediately after the link is disconnected, after a certain time period expires, or never (permanently bonded). When bonding expires, the entities must repeat the pairing process again. Users may generate, receive and/or send data, including identification data and/or authentication data via user interface module 502 coupled one or more applications 504, 506 that may communicate via transport protocols RFCOMM 510 coupled to L2 CAP 512. Each of the user interface 502 applications 504, 506, RFCOMM 510 and L2 CAP 512 may communicate with security manager 508.

In FIG. 5, an exemplary security management configuration is illustrated, that may be incorporated into a host software package on device(s) 310, 312 and vehicle(s) 302, 304. For greater flexibility, authentication and authorization can occur after determining the security level of the requested authentication service; in this case, authentication occurs after the ACL link is established. Of course, other authentication can occur with initial establishment of the ACL link. In FIG. 5, security manager 508 resides on the Bluetooth host and communicates with L2 CAP 512 and with link manager/controller 516 through host control interface (HCI) 514. Typically, a connect request from a portable device to a vehicle (and vice-versa) arrives at L2 CAP 512, where the L2 CAP 512 requests evaluation from security manager 508. Security manager 508 looks up the requested service in database 522 for security information, and looks the requesting device's BD_ADDR or International Mobile Equipment Identity (IMEI) number in database 520 for access authorizations. Security manager 508 then begins the necessary authentication and (if needed) encryption procedures with the link manager 516 through HCI 514. If authentication is determined to be positive, link manager 512 provides a response through HCI 514, and L2 CAP 512 finishes the connection setup process. The security manager architecture in FIG. 5 could be used to implement link-level (Mode 3) security as well.

The configuration of FIG.5 may implement basic security operations primarily at the link manager/controller 516 levels. Link controller 516 can implement key-generating algorithms, random number processes, and basic communication of the various security parameters between a vehicle (e.g., 302, 304) and a portable device (e.g., 310, 312). Link manager 516 provides a set of commands that enable the formation of link management protocol packets containing the security parameters. HCI 514 provides a means for the host to communicate security items to the Bluetooth module for use by the link manager controller 516. At the link layer, there may be several different entities used to maintain security. A PIN can be used as either a fixed number, preprogrammed into the Bluetooth unit, or a number that's entered by the user at the beginning of each secure session. There are several ways that a portable device (e.g., 310, 312) and a vehicle (e.g., 302, 304) (and/or another portable device in an authentication group) can be provided the same PIN: if the portable device and vehicle are being set up to exchange files and/or data, then each can ask for a password, in which a common PIN is derived from the link keys. In another embodiment, a vehicle (e.g., 302, 304) may be set up with user authentication profiles comprising a database of BD_ADDR/IMEI values and associated PIN codes. The security manager 508 can enter these via an encrypted Bluetooth link or through an ordinary cable connection. When a device attempts to connect, the application asks for a PIN (or retrieves one that was previously stored), from which the link keys are derived. If the user's PIN matches, then both devices create the same link key and authentication and, if needed, encryption can proceed successfully. Under one embodiment, the PIN may be associated with a user rather than with the device.

An authentication key, which also may operate as a link key, may be configured as 128 bits long and may be used by one device to insure that the other device is who it claims to be. The link key can either be temporary, where it is used for one session only (i.e., devices not bonded), or semi-permanent in which it is stored and used for several sessions or over a time period (i.e., devices bonded). Stored link keys are semi-permanent because they can be either changed or removed at a later time. As a result, paired and/or bonded devices can derive and store a new link key during each session if desired. The link key may be used to generate encryption keys, such as initialization keys, unit keys, combination keys and master keys. An initialization key is used as a link key when two devices first connect. It is normally created only once and used to protect the generation and transfer of other keys that are more secure than the initialization key. A unit key is on that is associated with a single Bluetooth device that has limited resources and can't store a large number of keys. This key is typically generated once and is not changed. A combination key is derived from inputs provided by both devices on a Bluetooth link and is considered more secure than a unit key. Unlike unit keys, a combination key is unique to a pair of devices, and not just one device. A master key is temporary and is used for the generation of an encryption key for broadcasting packets to multiple slaves. An encryption key may be used in a streaming algorithm to change plain text into cipher text and vice versa. The key can be as short as 8 bits and as long as 128 bits.

Once any of the portable devices (310, 312) and respective vehicles (302, 304) are paired/bonded, the system may be configured to dynamically assign authentication and vehicle access and permissions. In some illustrative embodiments, user devices may be configured to allow them to access and operate vehicle using their device, with or without a key fob. In other illustrative embodiments, vehicle operations and functions (e.g., comfort settings, infotainment preferences, on-demand purchased options, etc.) may also be enabled via a user's device.

Figure 6:
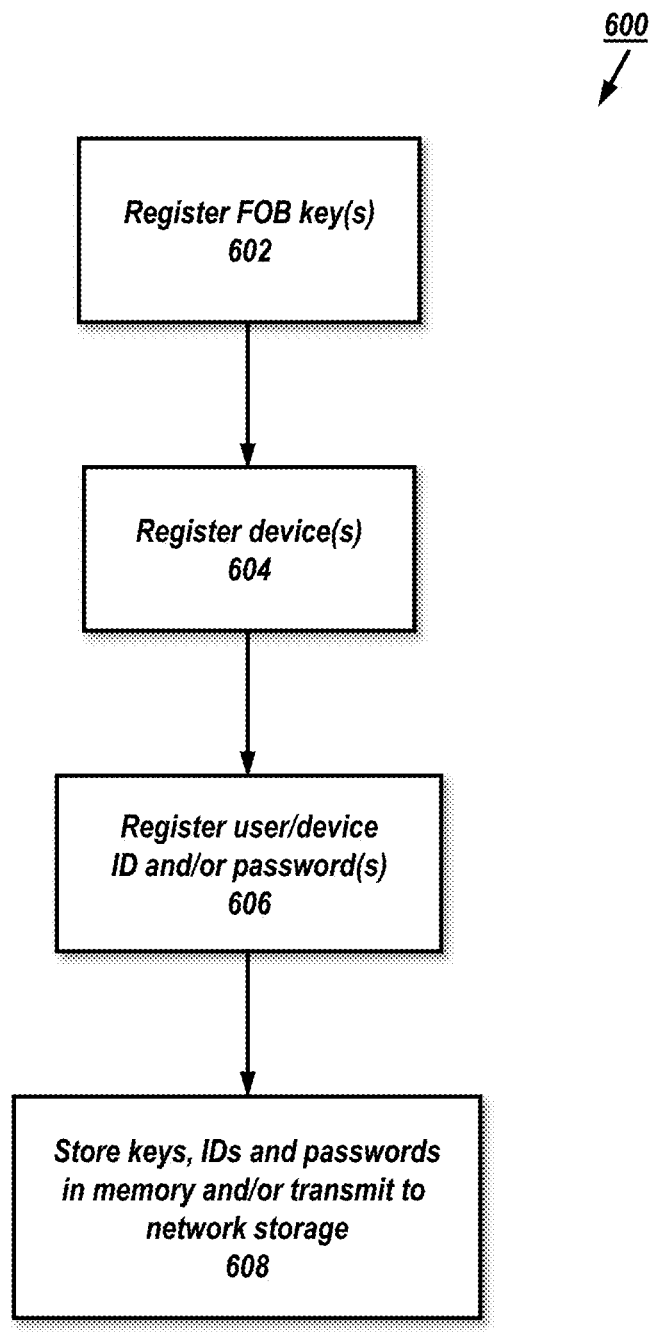
FIG. 6 shows an illustrative method for registering fob keys for a particular vehicle and/or user, along with user device data and identification for network storage to allow dynamically managing vehicle access under an illustrative embodiment.

FIG. 6 shows a simplified flow diagram 600 for configuring a vehicle system for dynamic vehicle identification and access under an illustrative embodiment. Starting with block 602, one or more fob keys (e.g., from 306 and/or 308) are registered with a vehicle (e.g., 302, 304). Once registered, the fob keys may provide access to a vehicle and/or activate predetermined functions within the vehicle. In block 604, one or more devices (e.g., 310, 312) are registered to the vehicle (e.g., 302, 304). In one example, the first device registered to the vehicle should be associated with the key fob registered with the vehicle. Subsequent devices registered to the vehicle may be based on the key fob, or from authenticated permissions provided from a previously registered device. Accordingly, under various illustrative embodiments provided below, a vehicle may be configured to have a key fob (e.g., 306) that has two or more devices (e.g., 310, 312) associated with it. In other illustrative examples, a device (e.g., 310) associated with a key fob (e.g., 306) may grant authentication permission to another device (e.g., 312).

In block 606, the system (e.g., 300) may register user and/or device identification (ID) which may include passwords and the like. In certain illustrative embodiments, the identification may include a UDID, an Android ID, an IMEI, an IMSI, and/or a user-created ID, where the identification and passwords may occur concurrently with device registration in block 604. In one example, an initial device registration may occur by pairing the device with the vehicle, whereupon a unique ID (e.g., IMEI) is transmitted from the device to the vehicle and securely stored. Upon completing the registration of the unique ID (e.g. IMEI), the device may transmit a secondary ID (e.g., IMSI), which may be used to further secure/strengthen the first ID. In certain illustrative embodiments, once one or more IDs are registered, the device may be asked to provide a password that may be used to provide dynamic permissions to other users. The password may be an alphanumeric password, a key, a voice-recognition password, and/or a fingerprint password. As voice-recognition and fingerprint technology is conventionally offered by manufacturers of devices (e.g., smart phones), these may be conveniently entered by users without requiring vehicle manufacturers to incorporate such technologies directly into the vehicle.

Once the registration of blocks 602-608 is completed, the keys, IDs and/or passwords may be stored in storage (e.g., 404) in the vehicle and may further be stored in a network storage (e.g., 318). The transmissions to the network storage (e.g., 318) may be performed from the vehicle (e.g., 302, 304) equipped with wireless communication, from the device (e.g., 310, 312), or a combination of both. As explained in further detail below, a security key may be used between the vehicle and the one or more devices to authenticate and authorize devices for accessing a vehicle and/or activating vehicle functions.

Figure 7:
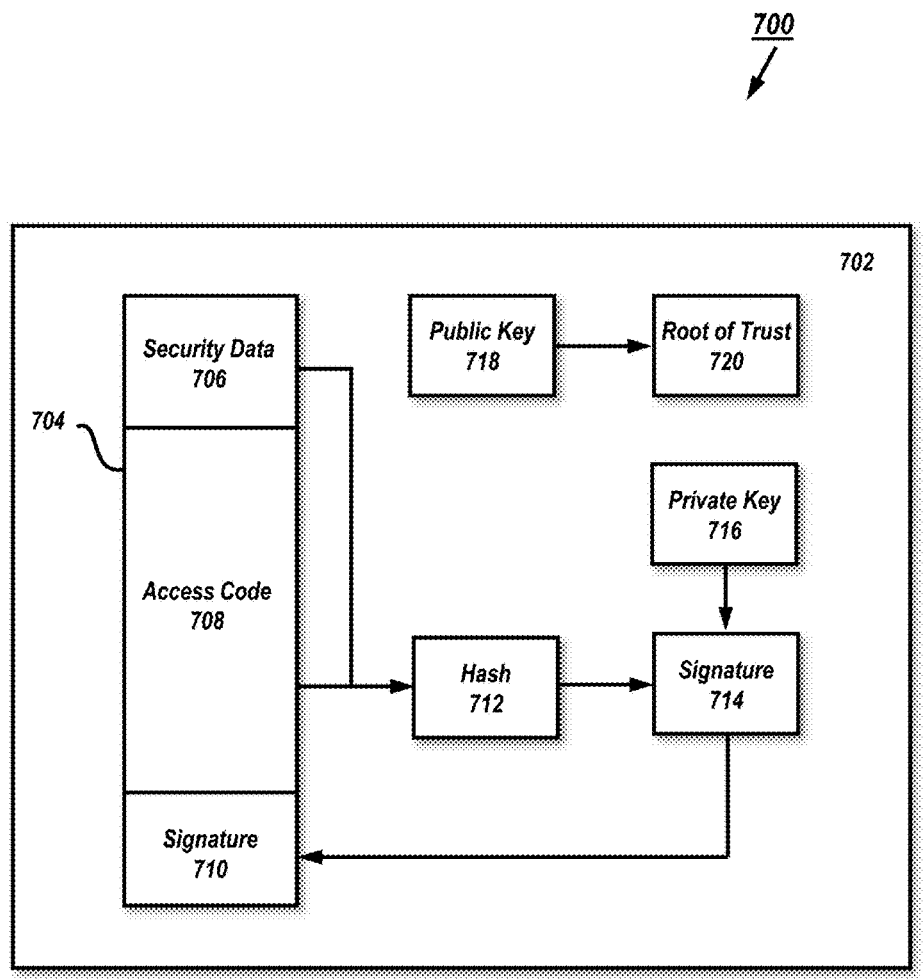
FIG. 7 shows an operating environment for the server of FIG. 3 for securing dynamic access authentication for transmission to one or more devices under an illustrative embodiment.

Turning to FIG. 7, an operating environment 700 is shown that may be executed on the server 318 and/or a vehicle (e.g., 302) for securing vehicle access codes under an illustrative embodiment. It should be understood by those skilled in the art that the operating environment 700 may be incorporated on other servers or devices, and that the present disclosure is not limited only to the server 318 or vehicle 302. As the server loads or generates an access code 708, a hash 712 may be created using security parameters 706 that may include a security header (HDR) for indicating payload encryption, and an associated key blob. A key blob may be configured to store encrypted keys to protect them when they are outside of a security boundary. A signature 714 may be created from the hash 712 and a private key 716, where the signature is associated 710 with the specific access code 708. In an illustrative embodiment, a public key 718 may be used to create a root of trust 720.

The operating environment 700 may be used to define a security boundary (or "secure environment" or "trusted environment") of the access codes transmitted to the device (e.g., 310). The definition of the security boundary may affect the desired protection on interfaces and the way in which sensitive security parameters (SSPs), firmware and software are protected. The root of trust 720 may be configured to store private (secret) data for the system, provide trusted functions and extend trust to other devices or entities via the functions and secrets. In one illustrative embodiment, the root of trust may be configured as a hardware root of trust, which is typically more secure than a software-based root of trust. Data stored in the root of trust 720 includes, but is not limited to, chip master key or root key, authentication key(s), secure data storage key(s) and other system-specific parameters used to describe or control the behavior of the system. When inside the security boundary of an operating environment (e.g., 700, 800), decryption keys may be determined using a chip master key as a key blob decryption key. A chip master key may be configured as a secret key that is not available to any resource except a secure environment. Once a decryption key is recovered, it may be used in a secure process to decipher the access code.

Figure 8:
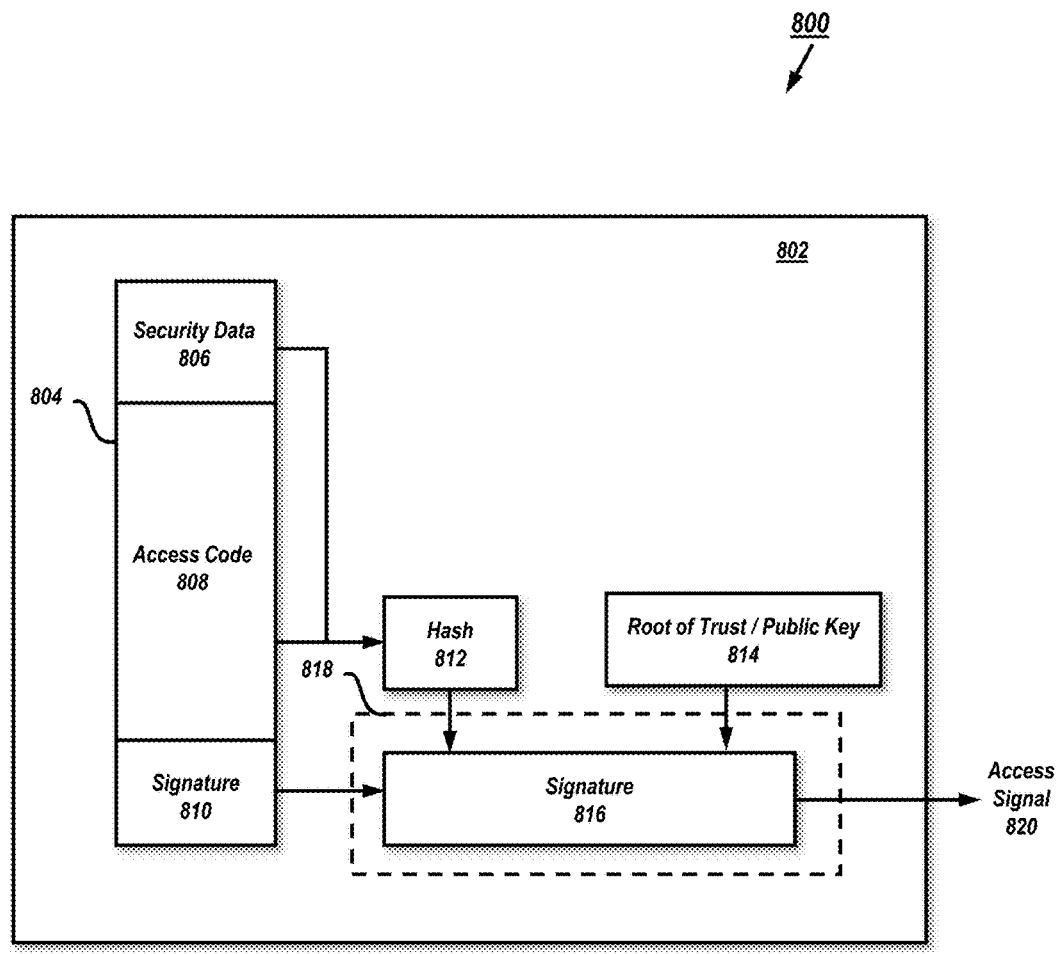
FIG. 8 shows an operating environment for the processing device of FIG. 3 for authenticating vehicle access challenges under an illustrative embodiment.

FIG. 8 shows an operating environment 800 for the device 310 under an illustrative embodiment, where the device 102 may be configured to authenticate an access code received from the server 318 or vehicle (e.g., 310) and generate an access signal 820. In certain illustrative embodiments, before an access signal is allowed on the device, the access code may be integrity checked, to ensure that it has not been altered, and authenticated to determine that the access was created by the correct party. The received access code 808, along with security parameters 806 and signature 810 are received in processing device 310, wherein the hash 812 is obtained and used with the root of trust and public key 814 and signature 816 to perform integrity checking and authentication in 816. If the integrity checking and authentication pass, the processing device 102 may generate an access signal 820 for accessing or activating one or more functions in the vehicle.

It should be understood by those skilled in the art that the embodiments of FIGS. 3-4 are merely illustrative, and that other suitable authentication processes may be used. Generally speaking, both the vehicle processor (e.g., 402) and the transponder (e.g., 306) may be configured know a secret number ("private key" or "secret key") that may be unique to that car. Both the car computer and the transponder also know an authenticating, secret, or secure algorithm (e.g., Advanced Encryption Standard (AES) algorithm utilizing Electronic Code Books (ECB) and/or Cipher Block Chaining (CBC), Cipher Feedback (CFB), and the like). Using the numbers of the transponder and the vehicle, the algorithm produces a third number. Under an illustrative embodiment, the car may generate a random number and transmits it to the transponder. Utilizing the random number and the secret key, they each produce a third number, which may be split out into two parts, A and B, which both the transponder and vehicle now know.

During authentication, the vehicle may send its B to the transponder, where the transponder can determine if the vehicle has correctly calculated B, authenticating that the vehicle has the correct secret key and correctly processed the authenticating algorithm. At this point, the transponder sends A to the vehicle, where the vehicle similarly determines if A is correct. In this example, once they are authenticated, both the transponder and the vehicle can confirm or authenticate each other's without actually revealing the secret key or the authenticating algorithm. In one example, an authentication algorithm may be configured as follows. Both a vehicle processor (e.g., 402) or computer C and a transponder (e.g., 306) T hold a shared secret key K and a pseudorandom function family (implemented using an authenticating algorithm, such as a Megamos Crypto algorithm or another suitable algorithm) PRF, of which $PRF_K$ is a specific instance parametrized by the key K. During operation, the PRF may output a bitstring that is split into two parts, A and B. Thus, in one simplified example, to perform an authentication exchange:

C chooses a random number r and computes $(A, B)=PRF_K(r)$

C→T: r,A

T computes $(A', B')=PRF_K(r)$ and aborts unless A=A'

T→C: B'

C verifies that B=B'.

Now C and T have verified that they can each compute $PRF_K$, and therefore hold the same key K.

Of course, those skilled in the art of cryptography will recognize that other authentication techniques utilizing random or pseudo-random functions and/or permutations may be utilized.

Figure 9:
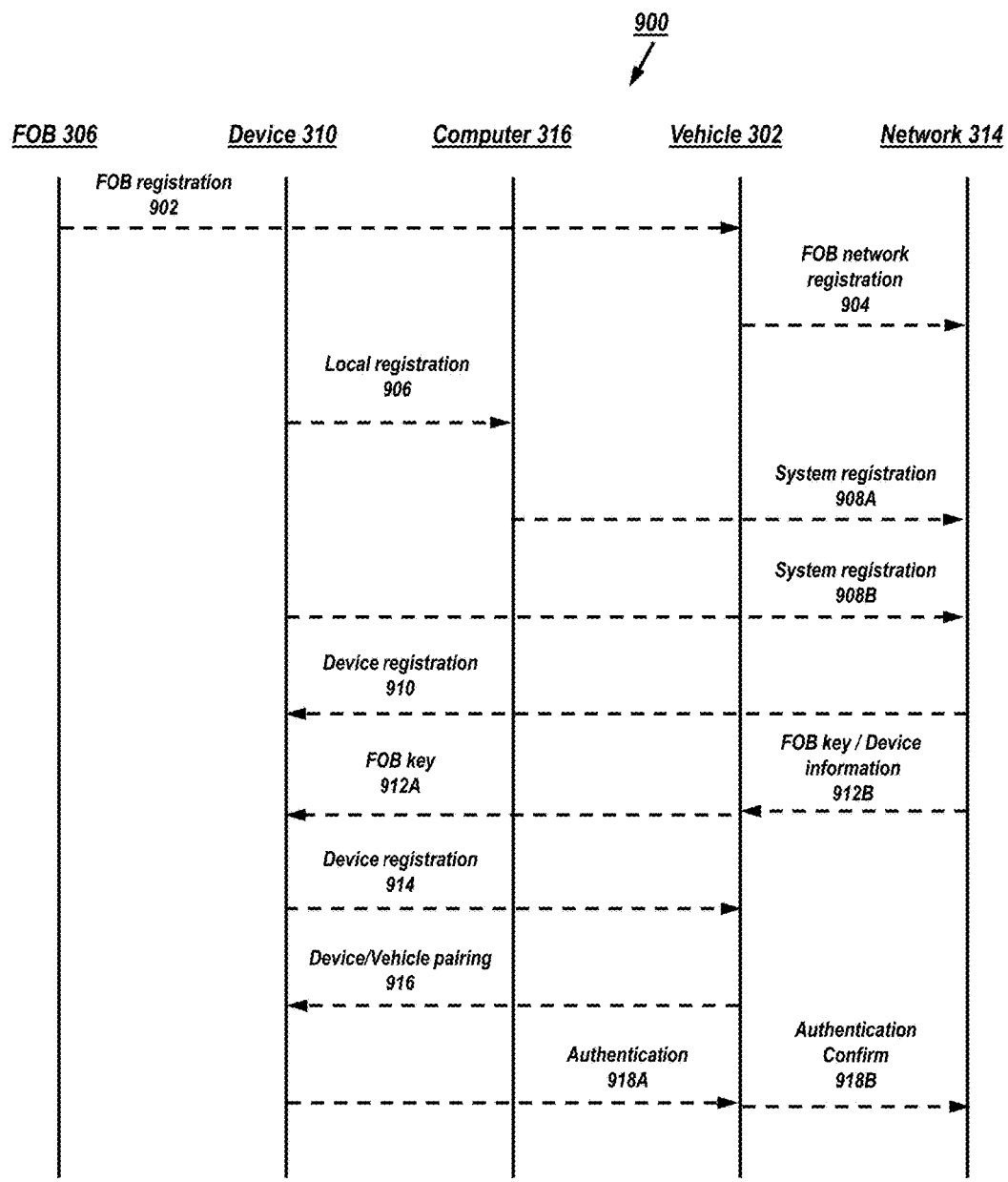
FIG. 9 shows a process flow for registering and authenticating a user fob and device for authorizing access for at least one user under an illustrative embodiment.

FIG. 9 is an exemplary flow diagram illustrating a registration process for a fob (e.g., 306) and a portable device (e.g., 310) with an authentication network (e.g., 314) and a vehicle (e.g., 302). In this example, registration of portable device 310 may further include the incorporation of local computer 304. The configuration of FIG. 9 may be advantageous in cases where vehicle 302 is equipped with short-range wireless communication (e.g., NFC, Bluetooth, Wi-Fi), and may have long-range wireless communication (e.g., cellular) that would allow vehicle 302 to directly communicate with authentication network 314.

The registration process of FIG. 9 allows users to register and authenticate themselves and their portable devices with authentication network 314, and to provide authentication permissions to other users. In step 902, a key fob 306 is registered with the vehicle 302, whereupon data relating to authentication for the fob described above is exchanged. In step 904, the vehicle and fob data, including authentication data, may be transmitted to authentication network 314, where authentication network 314 may store and process the received data in a server (e.g., 318) or similar device(s) associated with the network 314. In step 906, the portable device 310 may register with local computer 316, whereupon device ID and/or any other device and/or user data/information is registered and stored. Such data/information may include, but is not limited to, SIM card ID number, an IMEI number, and/or Bluetooth address (BD_ADDR). This information may then be stored in computer 316 (or send directly to the network 314, discussed below) as an authentication profile for the registering user. In this embodiment, users may manually change or augment the authentication profile at computer 316 using software specifically configured for interaction with device 310 and authentication network 314. For example, users may add or configure devices to be part of an authentication group, or to allow users to manually enter modifications to authentication rules and/or permissions. The device/user identification and authentication profile are then transmitted from computer 316 to authentication network 104 to initialize system registration.

In certain illustrative embodiments, the registration between device 310 and computer 316 may be configured via a dedicated wired connection. In other illustrative embodiments, the registration between device 310 and computer 316 may be done via a wireless (e.g., Wi-Fi, Bluetooth) connection. Once registered, computer 316 may transmit the information to authentication network 314 in step 908A, where one or more network servers (e.g., 318) may associate the device information with the registered fob. In certain illustrative embodiments, registration of a device (e.g., 310) may occur directly with authentication network 314 in step 908B, instead of through computer 316, where the device 310 transmits device ID and/or any other device and/or user information to authentication network 314, where it is processed and stored in one or more network servers (e.g., 318). In this example, device 310 may perform the functions of computer 316 without requiring a separate device or apparatus.

The authentication network 314 may then process the device and fob information in order to associate them together for the vehicle 302. In step 910, the authentication network 314 registers the device 310 for use with the authentication network 314, and in step 912A the authentication network 314 provides a fob key for associating the device 310 with fob 306. In some illustrative embodiments, the fob key provided in step 912A is not the same secret key used by the fob 306 when authenticating with the vehicle 302, but is a separate and distinct public/private key utilized by the device 302 to securely communicate with the authentication network 314 and/or the vehicle 302. The network 314 also provides the same fob key to the vehicle 302 in step 912B, together with the device data/information in order for the vehicle 302 to recognize device 310 and to allow the device 310 to securely communicate with vehicle 302. In certain illustrative embodiments, the network 314 may perform step 912A before step 912B. In certain illustrative embodiments, the network may perform step 912B before step 912A.

In step 914, the device 310 requests device registration. In some illustrative embodiments, this is performed when the device 310 is in proximity to the vehicle 302 and communicating via a wireless protocol (e.g., Bluetooth, NFC). In step 916, the vehicle 302 performs device/vehicle pairing, which may include a challenge to device 310 for authentication. In step 918A, the device 310 responds with authentication data that includes device information and the fob key received from the authentication network 314. If the authentication data received from the device 310 is valid, the vehicle 302 may authenticate the device to communicate with vehicle 302 to allow the device 302 to send commands for accessing the vehicle 302 and/or to activate or control vehicle functions (e.g., start vehicle, control entertainment system, roll down windows, etc.). Device 310 may be equipped with special software providing a user interface for communicating commands to the vehicle 302 and for interfacing with other software and/or hardware on the device to provide further features (e.g., loading music playlist, activating telephone call) that may be utilized as commands when communicating with the vehicle 302. In addition, the user interface may provide capabilities for further enhancing security by providing access to device components (e.g., keyboard, fingerprint sensor, voice recognition, etc.) that may be used in addition to the authentication data. In one example, after the authentication of step 918A is performed, the vehicle 302 may be configured to send a second challenge to the device 310 that requires the user to provide a second entry to complete the authentication. In this example, the second challenge may include, but is not limited to, a password entry via the device keyboard, a fingerprint entry, and a voice recognition entry. In some illustrative embodiments, multiple challenges may be configured to be transmitted as a multi-layer, single challenge.

In an illustrative embodiment, the vehicle 302 may confirm authentication to network 312 in step 918B. In some illustrative embodiments, device 310 may confirm authentication directly to network 314. One authentication is confirmed, the network 314 may associate the device 310 with the registered fob from step 904 as an authorized fob/device for communicating with vehicle 30. Alternately, the network may preliminarily associate the device 310 with fob 306 in any of steps 908A-B and confirm the association once authentication is confirmed in steps 918A-B.

Turning now to FIGS. 10-11B, various illustrative tables are shown (1000, 1100, 1102) that may be used as reference tables in an authentication network (e.g., 314) to track authorized users, user devices and fobs for one or more vehicles. FIG. 10 shows an example of an authorization table that indicates authorized users and fobs for a plurality of vehicles under an illustrative embodiment. In this example, two vehicles (Vehicle_1, Vehicle_2) are associated with authorized users and fobs as shown, and may be associated together as a vehicle group comprising Vehicle_1 and Vehicle_2. In this example, the first vehicle (Vehicle_1) has one authorized user (User_1) and one authorized fob (FOB_A). The second vehicle (Vehicle_2) has three authorized users (User_1, User_2, User_3) and one authorized fob (FOB_B). In some illustrative embodiments, users may be identified and authorized via their device, where one device is associated with one user. In some illustrative embodiments, multiple users may be associated with one device. For example, a device configured with a plurality of SIM cards may be utilized with a plurality of respective users, where each user may authenticate themselves using a device fob key (e.g., received vie 912A) and a SIM card ID (ICCID). Accordingly, a plurality of users may be registered/authenticated with a vehicle using the same fob key along with their respective ID information. Alternately different fob keys may be provided for each user at the time of registration/authentication discussed above in connection with FIG. 9.

FIG. 11A shows an example of an authorization table 1100 for a plurality of users (User_1, User_2, User_3) where device identification (ID) data, passwords and/or trusted (authenticated) fobs are registered for vehicle access under an illustrative embodiment. In some illustrative embodiments, a first user (User_1) is authenticated with a device having a respective device ID (Dev_1), a registered password (Pass_1) and a trusted (authenticated) fob (FOB_A). A second user (User_2) is authenticated with a device having a respective device ID (Dev_2), and a device password (Pass_2), but does not have an associated fob. A third user (User_3) is authenticated with a device having a respective device ID (Dev_3), a registered password (Pass_3) and a trusted (authenticated) fob (FOB_B). As will be explained in further detail below, the authentication tables may be referenced by the vehicle and/or authentication network to grant/deny permissions for accessing vehicles and/or activating function(s). Thus, under an example, if the first user (User_1) approaches Vehicle_2 of FIG. 10 attempting to use his fob (FOB_A), access will be denied.

FIG. 11B shows an example of an authorization table for a plurality of users (User_1, User_2, User_3) where device identification (ID) data, passwords and/or trusted fobs, together with paired fobs and devices for specific users, are registered for vehicle access under an illustrative embodiment. In this example, a first user (User_1) is authenticated with a device having a respective device ID (Dev_1), a registered password (Pass_1) and a trusted (authenticated) fob (FOB_A) that is also associated with the device (Dev_1). The associated device allows the user (User_1) to access and/or activate functions in a vehicle using the fob and/or device (Dev_1). A second user (User_2) is authenticated with a device having a respective device ID (Dev_2), and a device password (Pass_2), but does not have an associated fob. A third user (User_3) is authenticated with a device having a respective device ID (Dev_3), a registered password (Pass_3) and a trusted (authenticated) fob (FOB_B) associated with the device (Device_3). The associated device allows the user (User_3) to access and/or activate functions in a vehicle using the fob and/or device (Dev_3). As will be explained in further detail below, the authentication tables may be referenced by the vehicle and/or authentication network to grant/deny permissions for accessing vehicles and/or activating function(s). Also, in some illustrative embodiments, the authentication network (e.g., 314) may transmit one or more authorization tables to the vehicle (e.g., 302) to allow for local processing and determination of authorized fobs and/or devices.

Figure 12:
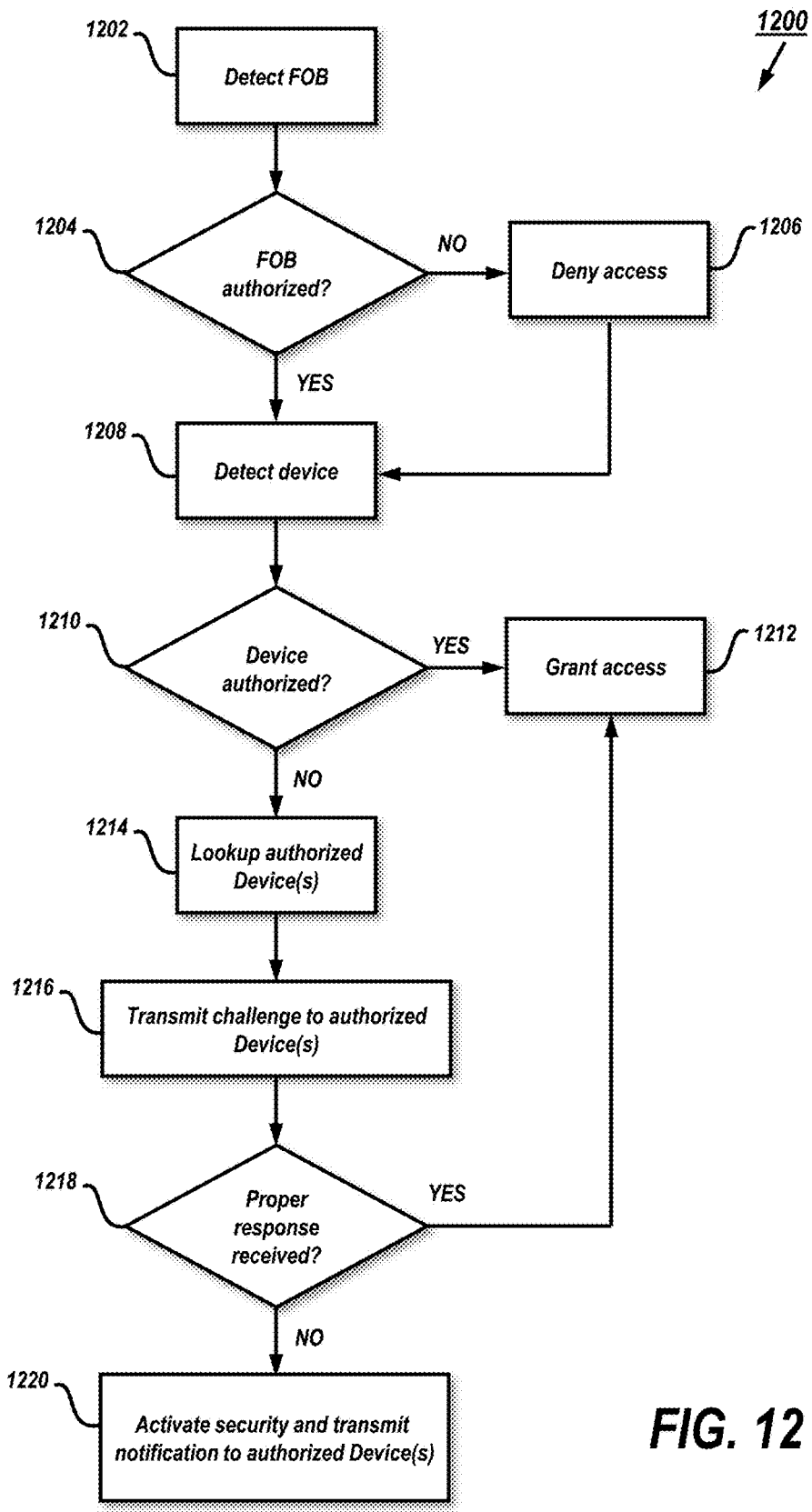
FIG. 12 shows a process for a vehicle to detect authorized fobs and devices and to transmit one or more challenges to authorized devices, and to activate a security function and/or transmit notifications to authorized devices if a proper response is not received under an illustrative embodiment.

FIG. 12 shows a process for a vehicle (e.g., 302) to detect authorized fobs and devices and to transmit one or more challenges to authorized devices, and to activate a security function and/or transmit notifications to authorized devices if a proper response is not received under an illustrative embodiment. In block 1202, the vehicle detects the presence of a fob, which may be done via proximity sensing and/or via receiving a command from the fob (e.g., user pressing a button on the fob). In decision block 1204, the vehicle determines if the FOB is authorized, for example, using any of the techniques disclosed herein and further disclosed in the example of FIG. 9 and authorization tables of FIGS. 10-11B. If not ("NO"), the vehicle denies access in block 1206 and moves to block 1208, where the vehicle detects the presence of a device (e.g., 310). If the decision block 1204 determines that the fob is authorized ("YES"), the process moves to block 1208 where the vehicle detects the presence of a device (e.g., 310). In decision block 1210, the vehicle determines if the device is authorized. The authorization may be determined via the registration and/or authentication disclosed herein and further disclosed in the example of FIG. 9 and authorization tables of FIGS. 10-11B.

If in decision block 1210 the vehicle determines the device is authorized ("YES"), the vehicle grants access to the device in block 1212 to communicate and/or send commands to the vehicle. If the vehicle does not recognize the device or determines the device is not authorized ("NO"), the vehicle (or authentication network) may look up authorized devices for the vehicle in block 1214 (e.g., via 1102) and transmit a challenge to one or more authorized devices in block 1216. In some illustrative embodiments, the challenge may be in the form of a message and/or a request for an entry for authorization. In one example, the vehicle (and/or authentication network) may transmit a message informing the device user that an attempt to access the vehicle is being made, and, if they want to authorize the entry. In one example, the authorization for entry may be determined by a password from the authorized device, a biometric entry from the device, or by other suitable means. In the decision block 1218, the vehicle determines if the proper response is received in response to the message and request for authorization. If an improper response is received, or if the user of the authorized device enters "no" for access, the vehicle may automatically disable device access and certain vehicle functions (e.g., via an immobilizer) until an authorized device and/or fob is present in proximity to the vehicle. If the user responds positively with the proper response ("YES") on the authorized device, the vehicle (and/or the authentication network) may grant access to the vehicle in block 1212.

In some illustrative embodiments, the access granted in block 1212 may be limited to one feature (e.g., unlocking a door), selected features, or configured to access the full features of the vehicle. In some illustrative embodiments, the granting of access may occur only between the network (e.g., 314) and the vehicle (302). However, in other illustrative embodiments, the authorized device may dynamically grant access to other devices to have the same or restricted features as the authorized device. In this example, when the authorized user provides a proper response in decision block 1218, the process moves to block 1212, where, as part of the access grant, the vehicle and/or the authentication network 314 proceeds to register the requesting (new) device (e.g., 312) via any of the techniques described herein, and particularly steps 908B-918B of FIG. 9, and authenticate the new device as an authorized device. In some illustrative embodiments, the fob key provided to the new device (e.g., 912A) may be restricted or limited to a predetermined time period that may be set by the authorized device (e.g., 310) and/or the authentication network. For example, the fob key may be set to expire after 8 hours, one day, one week, etc. In another example, the new user's fob, while unauthorized to access the vehicle, may be associated with the user's newly authorized device such that the new user's device will only provide access when the new user's fob is detected together with the device.

Figure 13A:
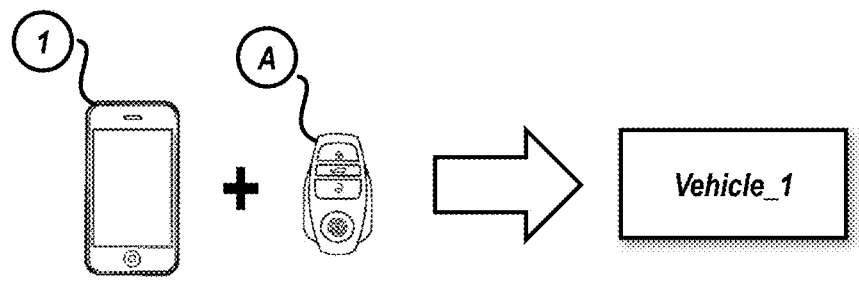
FIGS. 13A-13C show various simplified examples of user devices, with and without an associated fob, approaching a vehicle and requesting access to a vehicle under illustrative embodiments.
Figure 13B:
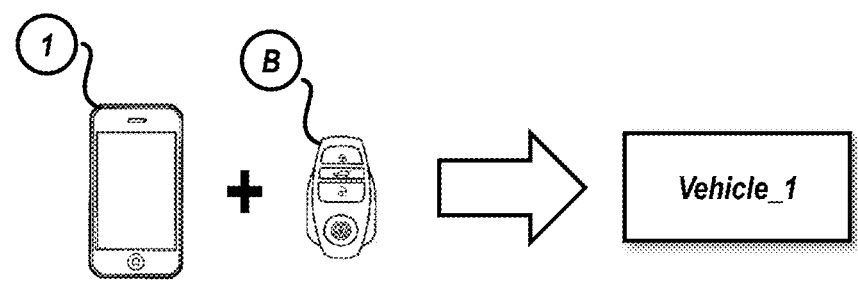
Figure 13C:
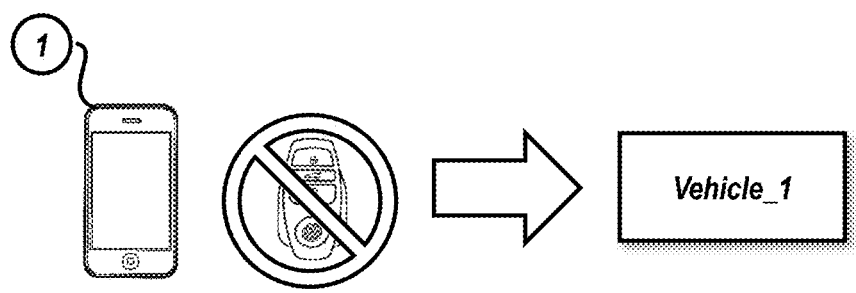
Figure 14:
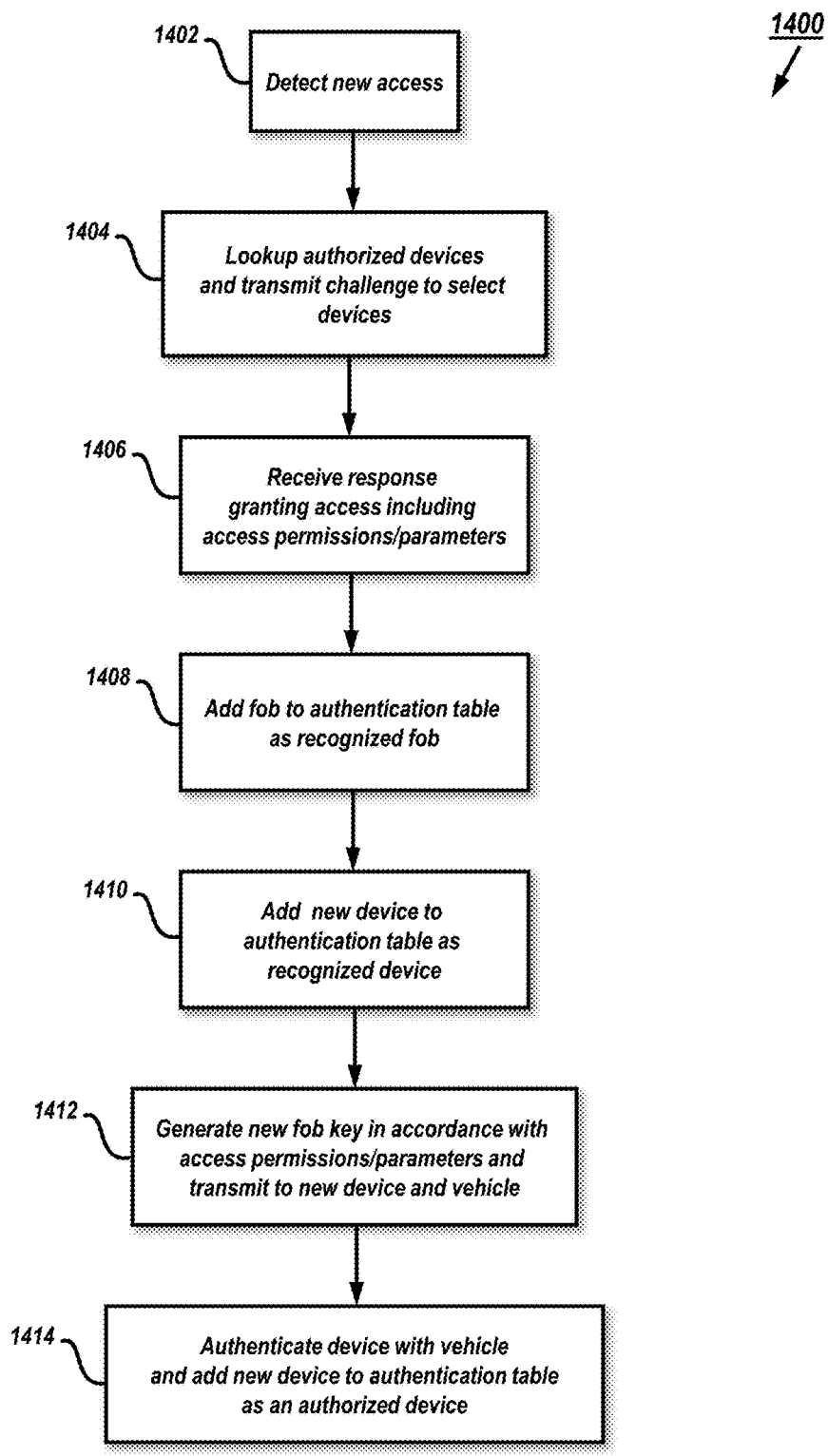
FIG. 14 shows a process flow for dynamically providing access and authentication from one device to another, where a registered and authenticated device allows recognition and access of other devices, along with access permissions under an illustrative embodiment.

FIGS. 13A-13C show various simplified examples of user devices, with and without an associated fob, approaching a vehicle and requesting access to a vehicle under illustrative embodiments. FIG. 13A provides a simplified example of a user (e.g., User_1) approaching a vehicle (Vehicle_1), where the user is in possession of a device ("1", or Dev_1) and fob "A" (FOB_A). Assuming in this example that both the device and fob are registered (e.g., see User_1 of FIGS. 10-11B) and authenticated with the vehicle, either of the device or fob may be used to access the vehicle, either by manual entry (e.g., pressing button on device and/or fob) or by proximity detection of the device, the fob, or both. FIG. 13B provides a simplified example of a user approaching the same vehicle, but possesses a different fob ("B") that is not registered or authenticated directly with the vehicle (Vehicle_1), but is registered with another vehicle of a registered vehicle group (e.g., see FIG. 10). In this example, the device "1" may be allowed to access the vehicle, even though the associated fob (e.g., fob "A") is not present. In one illustrative embodiment, a challenge (e.g., "do you want the vehicle to recognize your fob for future access? (Y/N/)") may be transmitted to the device "1" to allow recognition the fob "B" for future access, since the device "1" is already registered and authenticated with the authentication system (e.g., 300). If accepted, the fob will be added to the authentication table as a recognized fob, and vehicle will grant access in the future to the device "1" without a challenge when it is being carried with fob "B". In FIG. 13C, a user approaches a vehicle (Vehicle_1) carrying a device "1" that is registered and authenticated, but the user does not possess a fob. If the device "1" is authenticated with the vehicle (Vehicle_1), the user Turning now to FIG. 14, a process flow 1400 is shown for dynamically providing access and authentication as described elsewhere herein from one device to another, where a registered and authenticated device (e.g., via FIG. 9) allows recognition and access of other devices, along with access permissions. In block 1402, a vehicle detects a new access, which may be from a device or a device/fob combination that is new to the vehicle (i.e., not recognized or authenticated). The new access may be a proximity detection of a device/fob, or a transmitted signal from the device/fob request for accessing the vehicle. The vehicle (and/or authentication system 300) then looks up authorized devices (e.g., via authentication table(s)) and transmits a challenge to select devices in block 1404. In some illustrative embodiments, the challenge may include a message informing the authorized device of the new, unauthorized, attempt, a request for permitting access, and a request for entry of access permissions (if any). The access permissions may include data such as time limitation parameters and/or vehicle function limitation parameters, which would serve as limitations on the new devices access.

The vehicle and/or the authentication system receives the response to the challenge granting access that includes access permissions and/or parameters in block 1406. If a fob is detected and access is permitted, the vehicle and/or the authentication system adds the fob to the authentication table as a recognized fob in block 1408. If a device is detected and access is permitted, the vehicle and/or the authentication system adds the devices as a recognized device in block 1410. As discussed above, a device/fob may be recognized as being part of a group, which may assist the vehicle and/or authentication system in associating the recognized device/fob with authorized devices/fobs. While the device/fob in blocks 1408-1410 is not authorized at this point to fully access the vehicle, the adding of the device/fob as a recognized device allows flexibility in associating the recognized device/fob with authorized devices/fobs.

In one example, if permission is given in block 1406 to authorize (authenticate) a device, the authentication system (and/or vehicle, if configured with suitable authentication software) may generate a new fob key in accordance with the access permissions/parameters and transmit the fob key to the device and vehicle, similarly to the embodiment disclosed above in connection with FIG. 9. In block 1414, the device authenticates with the vehicle using any of the techniques discussed above, and is added to the authentication table as an authorized device. Without any access permissions/parameters, the device would have a default access to the device which may include the same or fewer vehicle features as the original permitting device.

Figure 15:
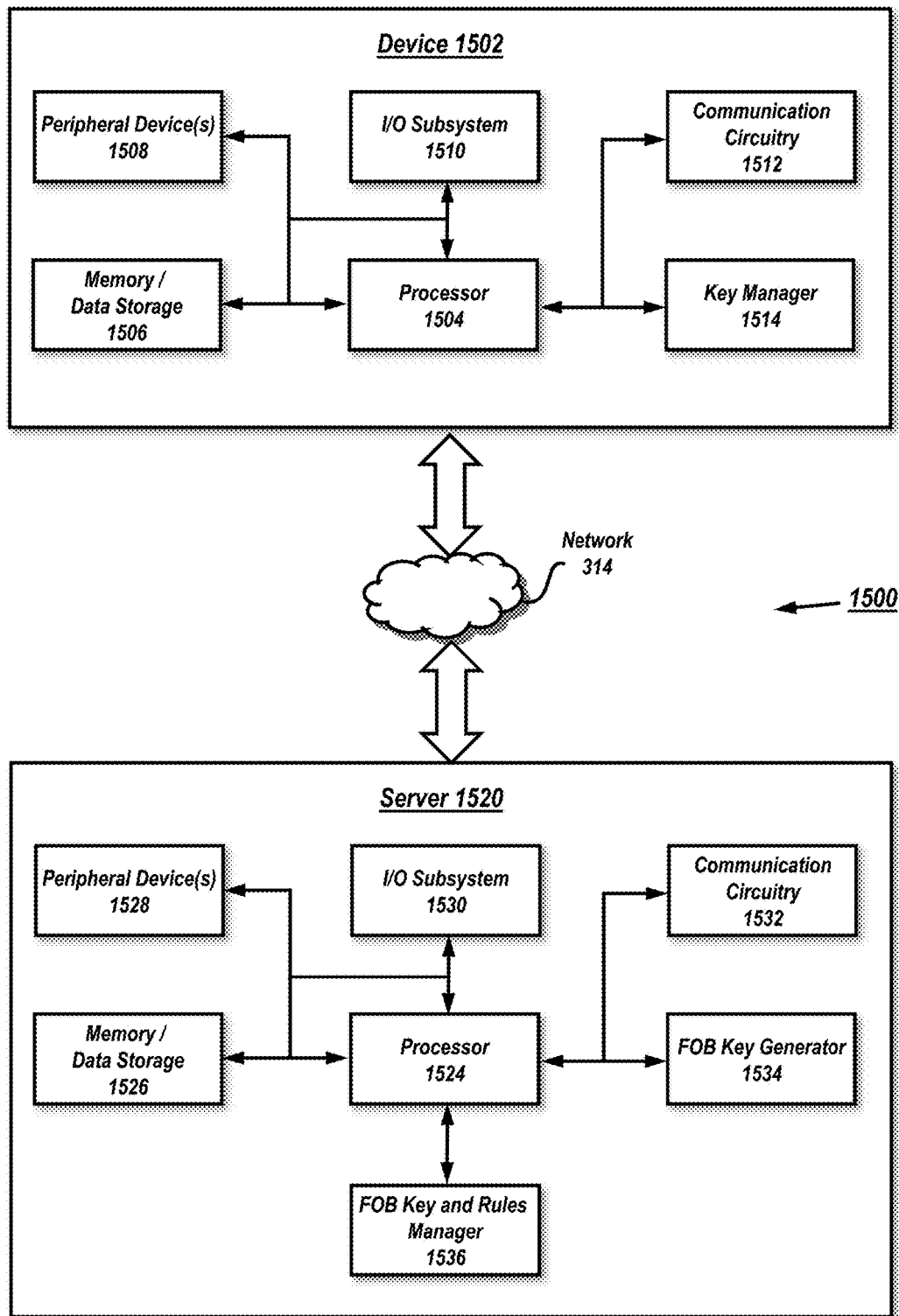
FIG. 15 shows a system that includes a processing device and a server communicating via a network, wherein the system is configured to generate and manage fob keys between a device and a server for vehicle access and functions under an illustrative embodiment.

FIG. 15 shows a system 1500 that includes a processing device and a server communicating via a network, wherein the system is configured to generate and manage fob keys between a device and a server for vehicle access and functions under an illustrative embodiment. In the illustrative embodiment, the processing device 1502 (which may be similar to 306, 308) includes a processor 1504 or processor circuit, one or more peripheral devices 1508, memory/data storage 1506, communication circuitry 1512, and a key manager 1514. The key manager 1514 may be configured to process and/or manage fob keys. The key manager 1514 may be incorporated into memory/data storage 1506 with or without a secure memory area, or may be a dedicated component, or incorporated into the processor 1504. Of course, processing device 1504 may include other or additional components, such as those commonly found in a digital apparatus and/or computer (e.g., communication circuitry, various input/output devices), in other embodiments. Additionally, in some embodiments, one or more of the illustrative components may be incorporated in, or otherwise form a portion of, another component. For example, the memory/data storage 1506, or portions thereof, may be incorporated in the processor 1504 in some embodiments.

The processor 1504 may be embodied as any type of processor currently known or developed in the future and capable of performing the functions described herein. For example, the processor 1504 may be embodied as a single or multi-core processor(s), digital signal processor, microcontroller, or other processor or processing/controlling circuit. Similarly, memory/data storage 1506 may be embodied as any type of volatile or non-volatile memory or data storage currently known or developed in the future and capable of performing the functions described herein. In operation, memory/data storage 1506 may store various data and software used during operation of the processing device 1504 such as access permissions, access parameter data, operating systems, applications, programs, libraries, and drivers.

Memory/data storage 1506 may be communicatively coupled to the processor 1504 via an I/O subsystem 1510, which may be embodied as circuitry and/or components to facilitate input/output operations with the processor 1504, memory/data storage 1506, and other components of the processing device 1502. For example, the I/O subsystem 1510 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1510 may form a portion of a system-on-a-chip (SoC) and be incorporated, along with the processor 1504, memory/data storage 1506, and other components of the processing device 1502, on a single integrated circuit chip.

The processing device 1502 includes communication circuitry 1512 (communication interface) that may include any number of devices and circuitry for enabling communications between processing device 1502 and one or more other external electronic devices and/or systems. Similarly, peripheral devices 1508 may include any number of additional input/output devices, interface devices, and/or other peripheral devices. The peripheral devices 1508 may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The server 1520 (which may be similar to 318) may be embodied as any type of server (e.g., a web server, etc.) or similar computing device capable of performing the functions described herein. In the illustrative embodiment of FIG. 15 the server 1520 includes a processor 1524, an I/O subsystem 1530, a memory/data storage 1526, communication circuitry 1532, and one or more peripheral devices 1528. Components of the server 1520 may be similar to the corresponding components of the processing device 1502, the description of which is applicable to the corresponding components of server 1520 and is not repeated herein for the purposes of brevity.

The communication circuitry 1532 of the server 1520 may include any number of devices and circuitry for enabling communications between the server 1520 and the processing device 1502. In some embodiments, the server 1520 may also include one or more peripheral devices 1528. Such peripheral devices 126 may include any number of additional input/output devices, interface devices, and/or other peripheral devices commonly associated with a server or computing device. The server 1520 also includes a fob key generator 1534 that is configured to generate cryptographic secret key for transmission to the device 1502 or a vehicle. The fob key and rules manager 1536 stores and manages fob keys that are transmitted, and may further store and process authentication tables and access permission and parameters.

In the illustrated embodiment, communication between the server 1520 and the processing device 1502 takes place via a network 314 that may be operatively coupled to one or more network switches (not shown). In one embodiment, the network 314 may represent a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). Generally, the communication circuitry of processing device 1502 and the communication circuitry 1532 of the server 1520 may be configured to use any one or more, or combination, of communication protocols to communicate with each other such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. As such, the network 314 may include any number of additional devices, such as additional computers, routers, and switches, to facilitate communications between the processing device 1502 and the server 1520.

In certain illustrative embodiments, the techniques for securely accessing vehicle functions may be configured to incorporate a vehicle function control file that includes data for setting or altering vehicle functions. In some illustrative embodiment, the vehicle function control file may be configured as pure data that is processed and/or executed on a vehicle to set and/or alter one or more vehicle functions. In other illustrative embodiments, the vehicle function control file may include executable code that may be configured to execute manually and/or automatically by a processor, such as a vehicle processing system.

Figure 16:
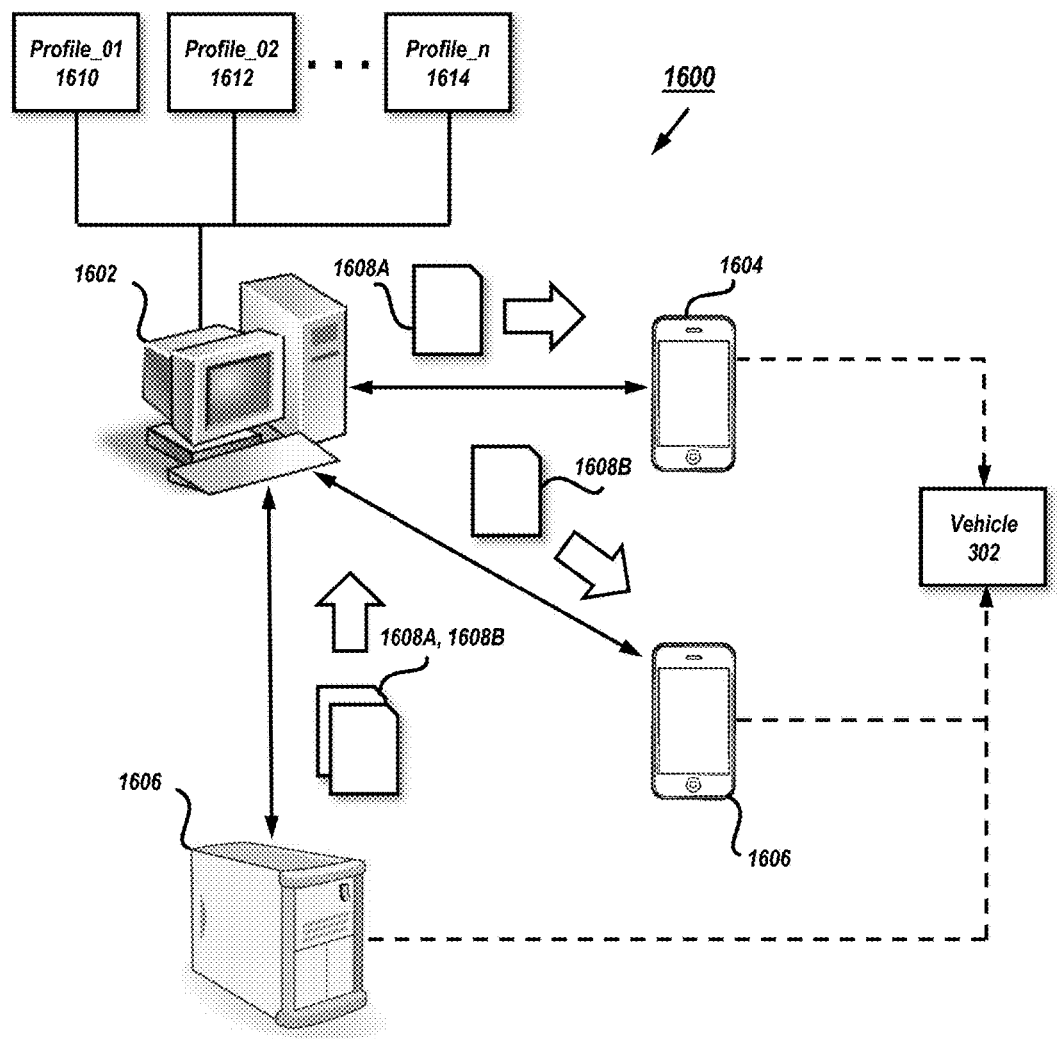
FIG. 16 shows a system for generating user profiles for creating customizable vehicle access and/or function control for fob keys under an illustrative embodiment.

Turning to FIG. 16, a system 1600 is disclosed that may be used in a system environment such as the one illustrated in the embodiment of FIG. 3, as well as other embodiments disclosed herein. In this example, a portable device 1604, which may be configured similarly as portable device 310, may be configured to communicate with a local computer 1602, which may be operated by a user or other entity choosing to generate one or more vehicle function control files for a vehicle (e.g., 302). Local computer 1602 may be configured similarly to computer 316. In this example, local computer 1602 may be configured with a profile database comprising a plurality of drive or user profiles (1610-1614) that may be generated and associated with fob keys generated in a manner disclosed elsewhere herein. Local computer 1602 may be configured to communicate with server 1606, which may be part of an authentication network (e.g., 314), and may be configured similarly as server 1520, discussed in greater detail above.

In this example, local computer 1602 may be configured to generate one or more driver (user) profiles (1610-1614) that are associated with a fob key in order to set or control vehicle functions when a user possessing the fob key in their device (1604, 1606) accesses and/or uses the vehicle. Servers 1606 may include wired and/or wireless communication interfaces to receive vehicle data, portable device data, profile data that may include vehicle access and/or function control data and other data from portable devices 1604, 1606 as well as one or more vehicles linked to a key fob. Additional data or instructions from computer 1602 may be received via wired or wireless interface through the network in system 1600. In some illustrative embodiment, the devices 1602, 1606 may be configured to communicate data with each other, including fob keys.

During operation, local computer 1602 may be used to receive device ID and/or device information from any of devices 1604-1606 in order to register those devices as authored users of a key fob for a vehicle. During the registration process, one or more driver profiles (1610-1614) may be generated on the local computer 1602 (discussed in greater detail below in connection with FIGS. 17-18), wherein the driver profile and associated data may be transmitted along with device and key fob (e.g., 306) information to server 1606. Server 1606 may be configured to generate a fob key (i.e., a software key) configured to allow the requesting devices (e.g., 1604-1606) to access one or more vehicle functions, similar to the techniques described herein.

In some illustrative embodiments, server 1606 may associate and/or append vehicle access and/or function control data from a respective driver profile (e.g., 1610, 1612) with a fob key. In some illustrative embodiments, the fob keys may be associated with vehicle access and/or function control data from a respective driver profile to form a vehicle function control file 1608A, 1608B and may be transmitted from the server 1606 to the local computer 1602. In some illustrative embodiments, the fob key and vehicle access and/or function control data may be configured as separate data files that are associated with the received fob key. The system 1600 may be configured to load the vehicle access and/or function control data only after the fob key is authenticated. In another illustrative embodiment, the vehicle access and/or function control data may be encoded into the fob key itself as data packets of the vehicle function control file, where a fob key authentication process unlocks the vehicle access and/or function control data and loads them into the vehicle for execution. It should be understood by those skilled in the art that the embodiment of FIG. 16 is illustrative only, and that multiple configurations are contemplated in the present disclosure. For example, the fob key generation, profile and vehicle access and/or function control data generation, and the fob key/vehicle access and/or function control data association may be performed entirely on local computer 1602.

In the example of FIG. 16, when server 1606 receives one or more user profiles (e.g., 1610-1614), the server 1606 detects or extracts the vehicle access and/or function control data and associates and/or appends the vehicle access and/or function control data with each respective fob key (1608A, 1608B), which together may be configured to represent a vehicle function control file. The local computer 1602 may then be configured to transmit each vehicle function control file (i.e., fob key, together with vehicle access and/or function control data) 1608A, 1608B to the respective device 1604, 1606. In FIG. 16 it can be seen that vehicle function control file 1608A is transmitted to device 1604, while vehicle function control file 1608B is transmitted to device 1606. Depending on the vehicle access and/or function control data, vehicle function control file 1608A may have different access permissions, perform different vehicle function control (e.g., limit an operational function of the vehicle) and alerts/messaging with vehicle 302 compared to vehicle function control file 1608B.

Figure 17:
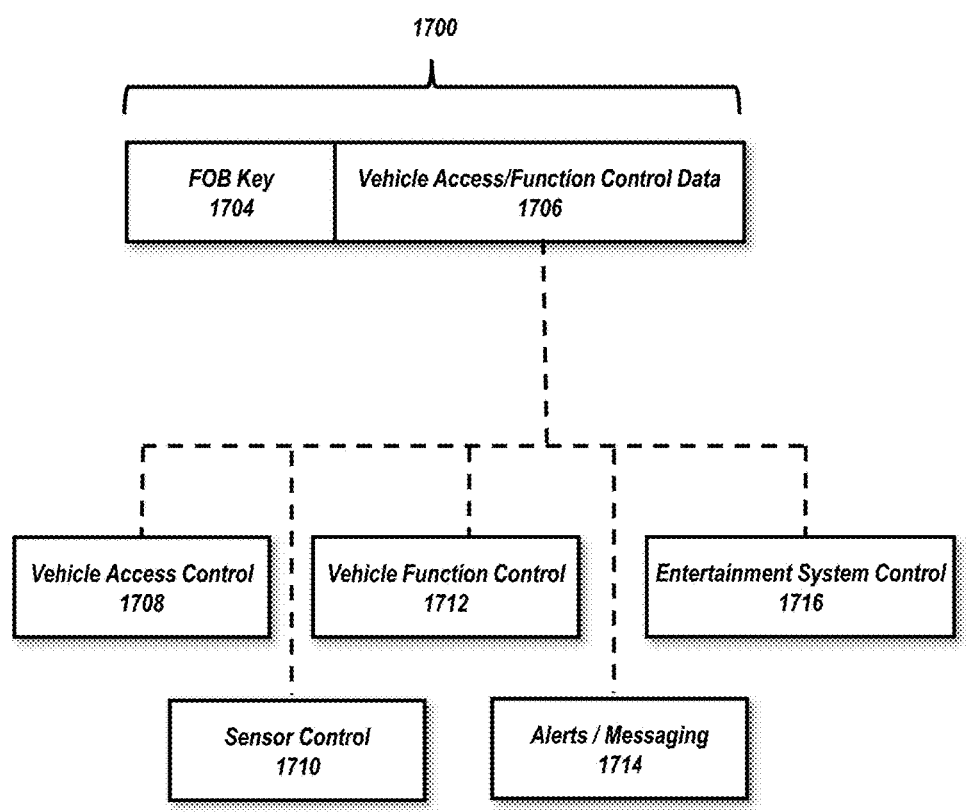
FIG. 17 shows an example of a vehicle function control file that includes a fob key and vehicle access and/or function control data that may include vehicle access control data, vehicle function control data, alerts/messaging data and/or entertainment system control data under an illustrative embodiment.

Turning to FIG. 17, an example of a vehicle function control file 1700 is shown that includes a fob key 1704 and associated vehicle access and/or function control data 1706 under an illustrative embodiment. As mentioned previously, the fob key 1704 and vehicle access and/or function control data 1706 may be combined into a single file, where authentication of the fob key 1704 automatically authenticates or unlocks the vehicle access and/or function control data 1706. Alternately, the fob key 1704 and vehicle access and/or function control data 1706 may be separate files, where vehicle access and/or function control data 1706 is accessed only after fob key 1704 is authenticated. In some illustrative embodiments, vehicle access and/or function control data 1706 may be subjected to separate authentication using any of the techniques disclosed herein or other techniques known in the art.

As can be seen in the example, vehicle access and/or function control data 1706 may include such data as vehicle access control 1708, sensor control 1710, vehicle function control 1712, alerts/messaging 1714 and/or entertainment system control 1716. Vehicle access control 1708 may include data that sets and/or controls physical access to the vehicle (e.g., 302), such as locking/unlocking doors, trunks, hoods, windows, etc. Sensor control 1710 may include data that sets and/or controls sensors and/or sensor parameters in the vehicle, such as blind spot sensors, collision sensors, brake sensors, and the like. Vehicle function control 1712 may include data that control vehicle functions and/or performance, such as speed and/or acceleration limits, engine RPM limits, braking sensitivity, gear shifting, etc. Alerts/messaging 1714 may include data that allows the vehicle (e.g., 302) to provide messaging externally (e.g., to server 1606, local computer 1602, and/or one or more portable devices registered as primary users) with regard to any vehicle function regardless of whether or not the vehicle function is set and/or modified by vehicle access and/or function control data. Illustrative alerts/messages include, but are not limited to, speeding alerts, entertainment system volume alerts, anti-lock brake activation alerts, access attempts to the vehicle, and the like. Entertainment system control 1716 may include data that allows the vehicle to limit entertainment system functions, such as volume limits, blocking of specific stations or entertainment apps, etc. Of course, those skilled in the art will appreciate that the present disclosure contemplates other types of vehicle and vehicle-related data (e.g., geofencing, GPS navigation control, etc.) that may be used, but that are not explicitly discussed herein. Furthermore, any portion (e.g., 1708-1716) of the vehicle access/function control data 1706 may be combined and/or made dependent on one or more other portions to provide additional restrictions on vehicle use (e.g., limit entertainment system volume when the vehicle exceeds a certain speed).

Figure 18:
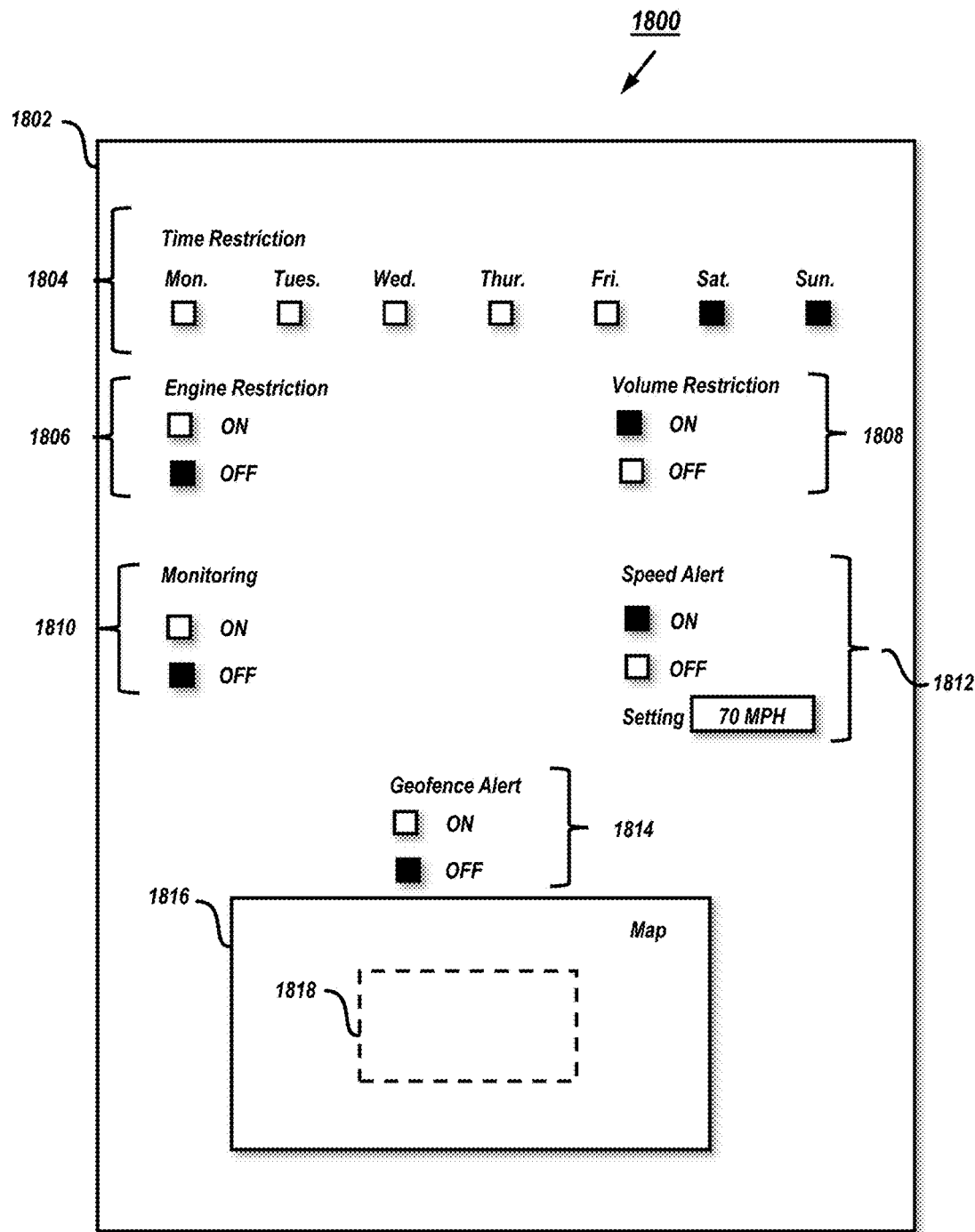
FIG. 18 shows an interface for entering data for vehicle access and function control, wherein the data may be used for a vehicle function control file under an illustrative embodiment.

FIG. 18 shows an interface 1800 for entering data for vehicle access and function control, wherein the data may be used for a vehicle function control file (e.g., 1700) under an illustrative embodiment. The interface 1800 may be implemented on a local computer (e.g., 1602) and/or may also be configured as a network interface (e.g., via server 1606) for creating, modifying and managing vehicle function control files for a user profile. In this simplified example interface 1800 may include a vehicle function control file interface 1802 for a user profile, where a user may enter limitations and/or restrictions for the vehicle function control file. Such limitations and/or restrictions may include a time restriction interface 1804 that allows a user to set times in which the fob key (e.g., 1704) may access the vehicle (e.g., via access control 1708). While the time restrictions 1804 are shown in days in the example (Mon.-Sun.), it should be understood by those skilled in the art that more detailed restrictions (e.g., restrict access between 11:00 PM and 6:00 PM) are contemplated in the present disclosure.

Engine restriction 1806 allows a user to enable/disable limits on the vehicle engine performance (e.g., via vehicle function control 1712). While not explicitly shown in the figure, specific restrictions may be entered via the interface 1802, for example, to restrict the vehicle from exceeding a specific speed (e.g., 70 MPH), restrict the engine from exceeding a specific RPM, and the like. Volume restriction 1808 allows a user to restrict the volume (e.g., via entertainment system control 1716) at which an entertainment system may be played in the vehicle. Monitoring 1810 may enable or disable alerts and/or messages (e.g., via alerts/messaging 1714) that may be associated with any of the vehicle function. While not explicitly shown in the figure, monitoring 1810 may be further configured to enable/disable monitoring for specific vehicle functions, such as speed alert 1812 and may also be configured to all a user to enter specific limitations for alert (e.g., 70 MPH). Alert/monitoring 1810 may also be configured to provide customized messaging services, such as text, email, and/or "in-app" messaging.

In some illustrative embodiments, a geofence alert 1814 may also be provided to allow a user to set alerts/messages when a vehicle exceeds a geographic perimeter. In the example of FIG. 18, a map interface 1816 may be provided for the interface 1802 that allows a user to set a restriction perimeter 1818 within the map 1816. If the vehicle exceeds the perimeter 181, an alert may be transmitted by the vehicle. In some illustrative embodiments the geofence alert 1814 may be combined with other vehicle access/function control data to enable other functions (e.g., vehicle access control 1708, vehicle function control 1712) to operate. As an example, the vehicle may be configured to shut down and/or restrict access to the vehicle (e.g., entering/starting the vehicle) if the vehicle is in a particular geographical area. Of course, those skilled in the art will appreciate that the simplified example of FIGS. 17-18 merely provide a portion of the configurations possible under the present disclosure, and that numerous other configurations are contemplated herein.

Figure 19:
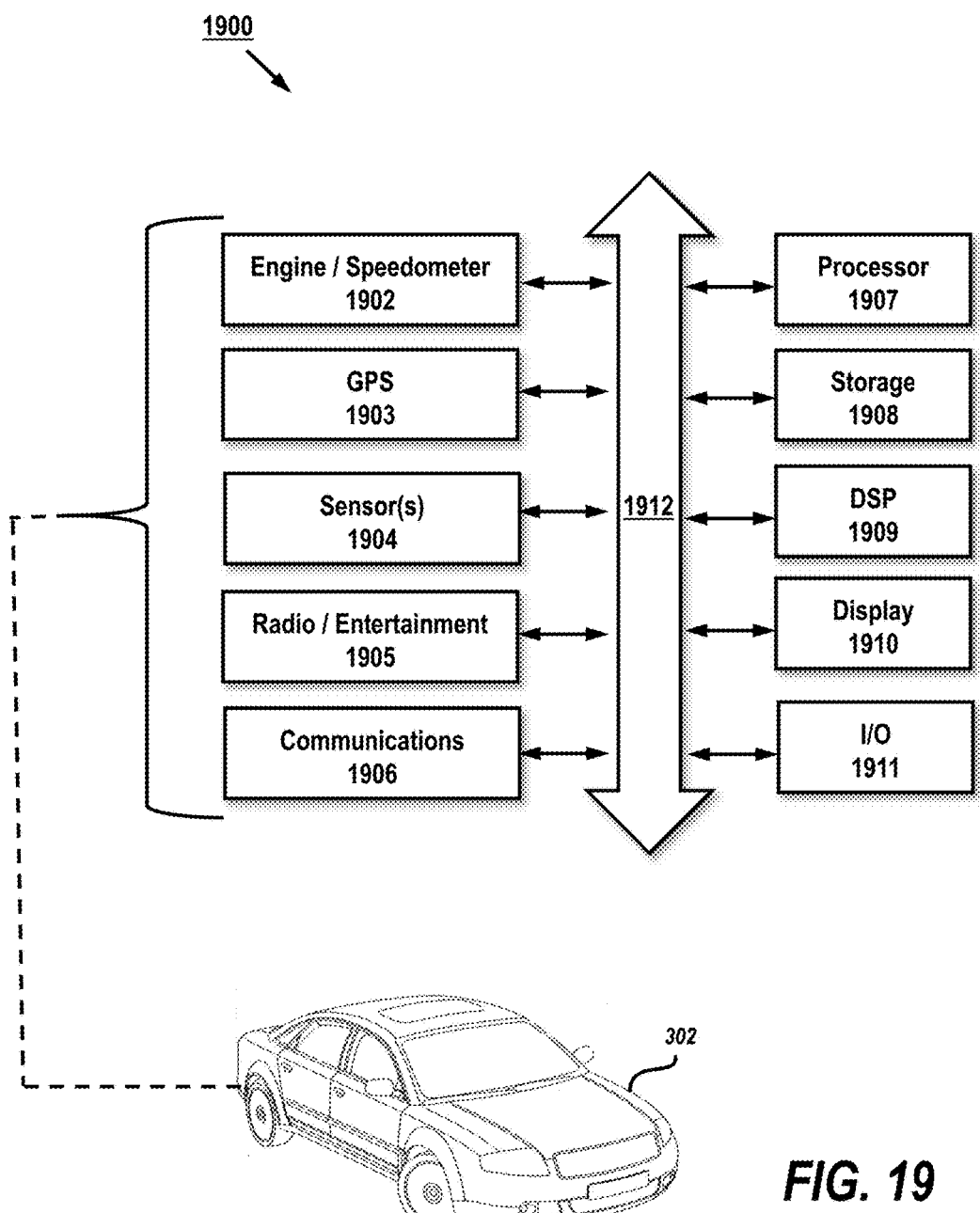
FIG. 19 shows illustrates a vehicle system block diagram showing multiple components and modules, for processing and executing vehicle function control files under one embodiment.

FIG. 19 shows illustrates a vehicle system block diagram 1900 showing multiple components and modules of a vehicle system for processing and executing vehicle function control files under one embodiment. The exemplary system 100 for a vehicle 302 comprising various vehicle electronics modules, subsystems and/or components. Engine/transmission module 1902 is configured to process and provide vehicle engine and transmission characteristic or parameter data, and may comprise an engine control unit (ECU), and a transmission control. For a diesel engine, module 1902 may provide data relating to fuel injection rate, emission control, NOx control, regeneration of oxidation catalytic converter, turbocharger control, cooling system control, and throttle control, among others. For a gasoline engine, module 1902 may provide data relating to lambda control, on-board diagnostics, cooling system control, ignition system control, lubrication system control, fuel injection rate control, throttle control, and others. Other aspects of module 1902, as they relate to hybrid and/or electrical vehicles, may also be used in some illustrative embodiments. Transmission characteristic data may comprise information relating to the transmission system and the shifting of the gears, torque, and use of the clutch. Under one embodiment, an engine control unit and transmission control may exchange messages, sensor signals and control signals and may also use data from the vehicle function control file to control vehicle functions.

Global positioning system (GPS) module 1903 provides navigation processing and location data for the vehicle 302. The sensors 1904 provide sensor data which may comprise data relating to vehicle characteristic and/or parameter data, and may also provide environmental data pertaining to the vehicle, its interior and/or surroundings, such as temperature, humidity and the like. Radio/entertainment module 1905 may provide data relating to audio/video media being played in vehicle 302. The radio/entertainment module 1905 may be integrated and/or communicatively coupled to an entertainment unit configured to play AM/FM radio, satellite radio, compact disks, DVDs, digital media, streaming media and the like. Communications module 1906 allows any of the modules of system 1900 to communicate with each other and/or external devices (e.g., server 1606, local computer 160, devices 1604-1606) via a wired connection or wireless protocol, such as Wi-Fi, Bluetooth, NFC, etc. In one embodiment, modules 1902-1906 may be communicatively coupled to bus 1912 for certain communication and data exchange purposes.

Vehicle 302 may further comprise a main processor 1907 that centrally processes and controls data communication throughout the system 1900 and may be configured to execute authentication of fob keys 1704 and vehicle access/function control data 1706 (i.e., vehicle function control files 1700). Storage 1908 may be configured to store data, software, media, files and the like. Storage 1908 may further be configured to store vehicle function control files 1700. Digital signal processor (DSP) 1909 may comprise a processor separate from main processor 1907, or may be integrated within processor 1907. Generally speaking, DSP 1909 may be configured to take signals, such as voice, audio, video, temperature, pressure, position, etc. that have been digitized and then process them as needed. Display 1910 may be configured to provide visual (as well as audio) indicial from any module in FIG. 10, and may be a configured as a LCD, LED, OLED, or any other suitable display.

The messages/alerts from 1714 may further be configured to display alerts/messages on display 1910. The display 1910 may also be configured with audio speakers for providing audio output. Input/output module 1911 is configured to provide data input and outputs to/from other peripheral devices, such as key fobs, device controllers and the like. As discussed above, modules 1907-1911 may be communicatively coupled to data bus 1912 for transmitting/receiving data and information from other modules.

Figure 20:
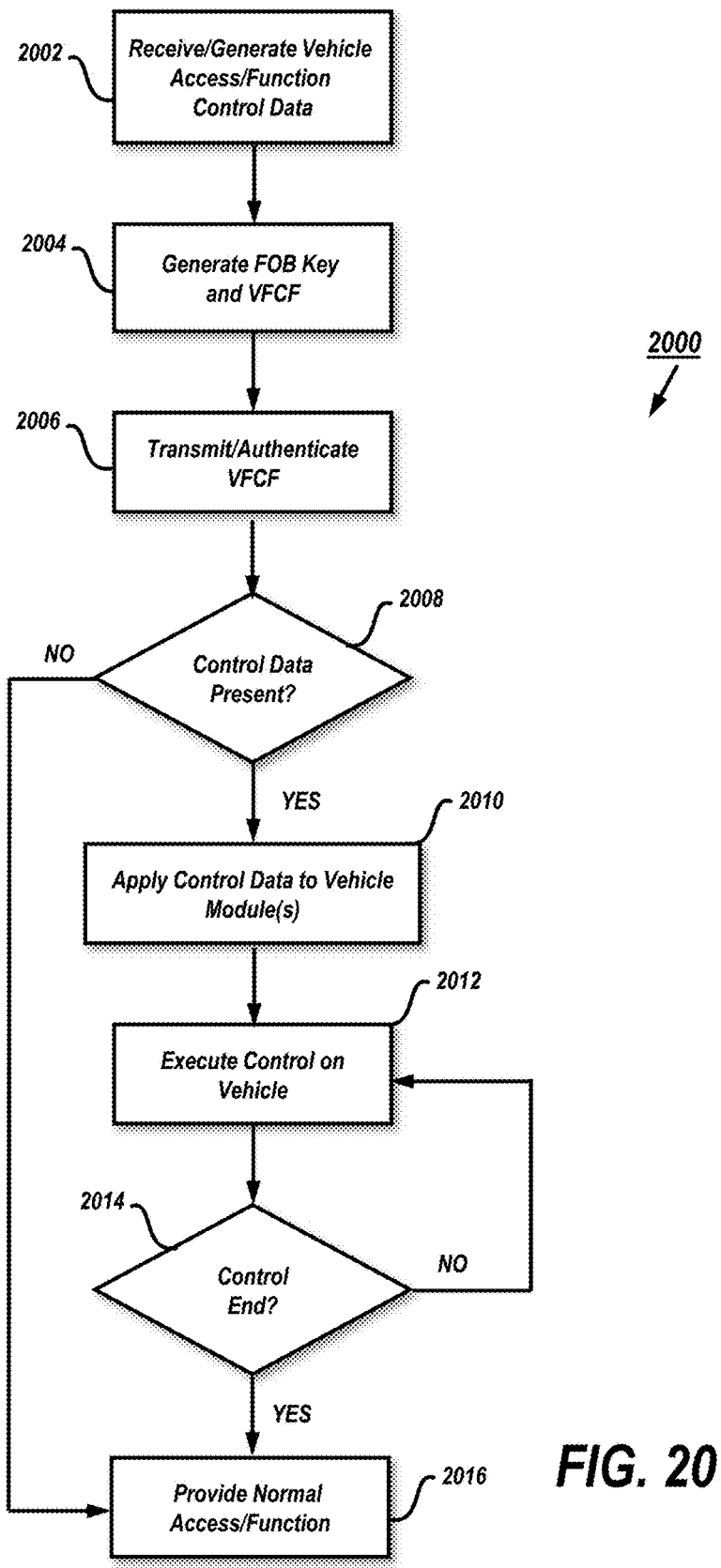
FIG. 20 shows a process flow for generating a fob key and vehicle function control file from associated control data and processing the vehicle function control data for application and execution on a vehicle under an illustrative embodiment.

FIG. 20 shows a process flow 2000 for generating a fob key and associated vehicle function control file from associated control data, and processing the vehicle function control data for application and execution on a vehicle (e.g., via any of the modules of FIG. 19) under an illustrative embodiment. In block 2002, vehicle access/function control data is generated or received. In block 2004, a fob key is generated using any of the techniques described herein and a vehicle function control file (VFCF) is generated. In block 2006, the vehicle function control file (e.g., 1700) is transmitted and authenticated by the vehicle. In decision block 2008, the vehicle determines if vehicle access/control data is present in the vehicle function control file. If not ("NO"), the process 2000 proceeds to block 2016, where normal (e.g., factory setting) vehicle access/functions are provided.

If decision block 2008 determines that vehicle access/function control data is present ("YES"), the process 2000 proceeds to block 2010 and applies the control data (e.g., via any of 1708-1716) to the vehicle (e.g., via any of modules 1902-1911) to execute the appropriate limitation/restriction/alert/messaging control function(s) on the vehicle in block 2012. In decision block 2014, the vehicle determines if the control parameters have ended. In some illustrative embodiments, the control of the vehicle function control file may end when the vehicle ignition is off, indicating that the user is no longer driving and/or has left the vehicle. In some illustrative embodiments, the control of the vehicle function control file may end when the vehicle ignition is off and the user's device (e.g., 1605) is no longer detected to be in proximity to the vehicle. If any of these cases do not exist ("NO"), the process 2000 continues to execute the controls on the vehicle in block 2012. If they do exist ("YES"), the process 2000 proceeds to block 2016 where normal vehicle access/functions are provided. Once the user (or another user with a similarly configured device) approaches or returns to the vehicle, the process 2000 may jump to block 2006 to authenticate the user and repeat the process.

Figure 21:
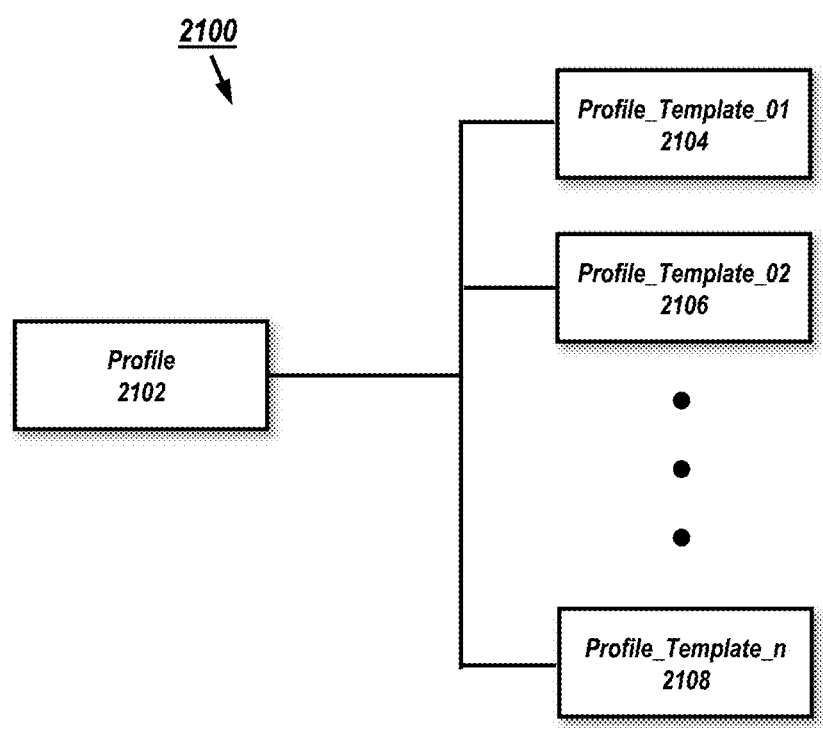
FIG. 21 shows a plurality of profile templates wherein one or more templates comprising vehicle access and/or vehicle function control data may be associated with a driver profile under an illustrative embodiment.

Turning to FIG. 21, an illustrative embodiment is provided for a configuration 2100 that may be implemented in a vehicle system (e.g., 300), wherein a driver profile 2102 may be generated with or associated with one or more profile templates 2104-2108. The driver profile 2102 may be configured similarly to that described in contain FOB key information (e.g., 1704) along with vehicle access and/or vehicle function control data (e.g., 1706). As described previously, a computer (e.g., 1602) may be configured with a profile database comprising a plurality of drive or user profiles that may be generated and associated with fob keys generated in a manner disclosed herein. Local computer (e.g., 1602) may be configured to communicate with a server (e.g., 1606), which may be part of an authentication network (e.g., 314), and may be configured similarly as server 1520, discussed in greater detail above.

In this example, a driver profile 2102 may be generated and/or modified in accordance with one or more driver templates 2104-2108 that may be configured with predetermined data relating to vehicle access control (e.g., 1708), sensor control (e.g., 1710), vehicle function control (e.g., 1712), alerts/messaging (e.g., 1714), and entertainment system control (e.g., 1716). Those skilled in the art will recognize that other suitable data for driver templates 2104-2108 may be utilized as well. The predetermined data for each template 210 may include data in any of a executable and/or non-executable form embodied in a tangible medium to allow or restrict a driver, with an associated driver profile (e.g., 2102), to control vehicle access, sensor settings, vehicle functions, alerts and/or messaging and/or entertainment system features and/or functions for the vehicle.

In some illustrative embodiments, once a profile is created or generated (e.g., 2102), the profile data (e.g., FOB key information, vehicle access and/or vehicle function control data) may be stored as a template, such as template 2104. As changes are made to the profile data, those changes may made within the profile template itself (e.g., 2104), or otherwise saved as a new profile template (e.g., 2106). As further changes are made, each of these changes may be saved separately in a new respective profile template (e.g., 2108).

In some illustrative embodiments, profile templates 2104-2108 containing profile data (e.g., FOB key information, vehicle access and/or vehicle function control data) may be associated with, or assigned to, a driver profile 2102. In one example, multiple profile templates (e.g., 2104-2108) may be generated containing pre-stored profile data (e.g., FOB key information, vehicle access and/or vehicle function control data). When a new device requests access to a vehicle (see, e.g., FIG. 9) one or more profile templates 2104-2108 may be associated with the generated FOB key. The one or more associated profile templates may be configured to expire or change over a predetermined time period. For example, after granting access to a new device, profile template 2102 may be associated with the newly-generated FOB key, and allow a driver to access and/or use the vehicle in accordance with the predetermined data stored in the profile template. The predetermined data may include time limitation data that may cause the profile template 2102 to expire after a time period and restrict access and/or usage of the vehicle. Alternately or in addition, after the expiration of the time period, the system may disable profile template 2102 and concurrently load profile template 2104, which enables or restricts other vehicle access and/or vehicle functions on a new set of parameters in accordance with the data contained therein. After another time period expires, the system may disable profile template 2104 and re-load profile template 2102. Alternately or in addition, the system may disable template 2104 and load yet another new profile template 2108.

It can be appreciated by those skilled in the art that the use of templates allows for flexible arrangements in associating or assigning various vehicle access and/or vehicle function control data to a FOB key. Such arrangements may advantageously allow for more refined control for vehicle access and/or functions for a particular driver. Additionally, such arrangements may provide owners of vehicles in commercial settings (e.g., work vehicles, rental vehicles) advantageous options in controlling vehicle usage. Some illustrative and non-limiting examples of templates are provided below. Those skilled in the art should appreciate that multiple additions and/or variations to profile templates are contemplated in the present disclosure.

[EX1] New Driver Profile Template
Disable engine-start unless seatbelt is on;
Infotainment sub-set lockout when car is moving;
Maximum stereo volume limiter;
Set a lower max-speed;
Artificial horsepower limiter;
Adapting assistance function parameters to have more cautions settings; and/or
Personalization settings (e.g., seat position, mirrors, radio presets, etc.).

[EX2] Valet Profile Template
Hide private settings from infotainment (e.g., recent destinations, home address, phonebook, etc.)
Full infotainment lockout;
Deny trunk access;
Deny glove-box access;
Set a lower maximum speed; and/or
Geo-fence with owner notification if vehicle exceeds the boundaries;

[EX3] Electronic Vehicle Samaritan Template
Allow another user to disconnect the charging cable after the vehicle is charged; and/or
Allow limited access to move vehicle out of a charging spot after charge is complete (or if penalties are being incurred).

[EX4] Vehicle Maintenance (Maintenance Valet) Template
Engine and vehicle access; and/or
Valet-lockout features if request to bring to dealer is granted by owner

[EX5] $3^{rd}$-Party Delivery Service Template
Only provide access to trunk unlock; and/or
Automatically lock after the party has left a radius.

[EX6] $3^{rd}$-Party Fuel Service Template
Only allow access to unlock/open gas-flap
Automatically lock after the party has left a radius The various technologies and techniques discussed herein provide an efficient platform for allowing a system to effectively authenticate users and implement customized vehicle use restrictions and/or limitation using a portable device (e.g., 302). These technologies advantageously provide means in which a primary user, such as a parent, may institute controls on a vehicle to enhance the safety of the vehicle for a child. Similarly, an employer may institute controls on a vehicle to enhance safety and limit liability for employees that may be driving company vehicles. Since the vehicle access (e.g., via fob key) and controls (e.g., via the vehicle function control file) are implemented on portable devices, the need for providing physical keys and/or key fobs may be eliminated. Furthermore, since the present technologies take advantage of the advanced communication and processing of modern portable devices, vehicle controls may be effectively customized and transferred to a vehicle with relative ease.

It should be appreciated by those skilled in the art that the techniques and configurations disclosed herein provide many flexible features to allowing dynamic access to a vehicle via a device, such as a smart phone, tablet, laptop, wearable device, and the like. Unique and novel technologies may provide secure communication between a vehicle and a device, which in turn may provide secure communication and access to the vehicle via other devices. By monitoring and updating authentication tables, an authentication system may efficiently recognize and associate users and groups of users to provide even further flexibility.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments may be implemented, in some cases, in hardware, firmware, software, or any tangibly-embodied combination thereof. The disclosed embodiments may also be implemented as instructions carried by or stored on one or more non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for authorizing access to vehicle functions for a vehicle, comprising:
   a processor;
   a data storage, operatively coupled to the processor, the data storage configured to store (i) fob data relating to a key fob linked to the vehicle, (ii) device data comprising data relating to one or more devices linked to the key fob that are authorized to access the vehicle, and (iii) vehicle access and/or function control data; and
   communications circuitry, operatively coupled to the processor, the communications circuitry configured to communicate with a new device is requesting access to the vehicle,
   wherein the processor is configured to generate a secure fob key for authenticating the new device based on the fob data and the device data,
   and wherein the processor is configured to generate a vehicle function control file based on (i) the vehicle access and/or function control data and (ii) the secure fob key, wherein the vehicle function control file is associated with a profile template configured to control access of the new device to the vehicle and control at least one operational function of the vehicle.

2. The system of claim 1, wherein the profile template is further configured to provide alerts for the vehicle based on the vehicle access and/or function control data.

3. The system of claim 1, wherein the profile template associated with the vehicle access/function control data comprises at least one of vehicle access control data, sensor control data, vehicle function control data, alerts/messaging data and entertainment system control data.

4. The system of claim 3, wherein the processor is configured to execute the vehicle function control file, for obtaining at least one of the following configurations for the vehicle:
- the vehicle access control data is configured to limit a time in which the vehicle is accessed via the new device;
- the sensor control data is configured to control a sensor parameter in the vehicle;
- the vehicle function control data is configured to control vehicle function and/or performance in the vehicle;
- the alerts/messaging data is configured to provide alerts and/or messages associated with the vehicle access/function control data in the vehicle; and/or
- the entertainment system control data is configured to control at least one function of the entertainment system in the vehicle.

5. The system of claim 1, wherein the processor is configured to replace the profile template of the vehicle function control file with a new profile template comprising a new vehicle function control file, configured to control at least one new operational function of the vehicle.

6. The system of claim 1, wherein the processor is configured to generate the vehicle function control file by selecting one of a plurality of profile templates comprising predetermined vehicle access and/or function control data.

7. The system of claim 1, wherein the vehicle function control file is configured to expire after a predetermined period of time.

8. A method for authorizing access to vehicle functions for a vehicle, comprising:
- receiving, in a storage, fob data relating to a key fob linked to the vehicle;
- receiving, in the storage, device data comprising data relating to one or more devices linked to the key fob that are authorized to access the vehicle;
- receiving, in the storage, a profile template comprising vehicle access and/or function control data;
- establishing communications, via communications circuitry, with a new device that is requesting access to the vehicle,
- generating, via a processor, a secure fob key based on the fob data and the device data; and
- generating, via the processor, a vehicle function control file based on the profile template and the secure fob key, wherein the vehicle function control file is configured to control access of the new device to the vehicle and control at least one operational function of the vehicle.

9. The method of claim 8, wherein the profile template is further configured to provide alerts for the vehicle based on the vehicle access and/or function control data.

10. The method of claim 8, wherein the profile template associated with the vehicle access/function control data comprises at least one of vehicle access control data, sensor control data, vehicle function control data, alerts/messaging data and entertainment system control data.

11. The method of claim 10, further comprising executing the vehicle function control file to enable one or more of the following operations:
- configuring the vehicle access control data to limit a time in which the vehicle is accessed via the new device;
- configuring the sensor control data to control a sensor parameter in the vehicle;
- configuring the vehicle function control data to control vehicle function and/or performance in the vehicle;
- configuring the alerts/messaging data to provide alerts and/or messages associated with the vehicle access/function control data in the vehicle; and/or
- configuring the entertainment system control data to control at least one function of the entertainment system in the vehicle.

12. The method of claim 8, further comprising replacing the profile template of the vehicle function control file with a new profile template comprising a new vehicle function control file, configured to control at least one new operational function of the vehicle.

13. The method of claim 8, wherein generating the vehicle function control file comprises selecting one of a plurality of profile templates comprising predetermined vehicle access and/or function control data.

14. The method of claim 8, wherein the vehicle function control file is configured to expire after a predetermined period of time.

15. A vehicle for authorizing access for vehicle functions for a new device, comprising:
- a processor;
- a data storage, operatively coupled to the processor, the data storage configured to store (i) fob data relating to a key fob linked to the vehicle, (ii) device data comprising data relating to one or more devices linked to the key fob that are authorized to access the vehicle, and (iii) vehicle access and/or function control data;
- communications circuitry, operatively coupled to the processor, the communications circuitry configured to communicate with a new device is requesting access to the vehicle to receive a vehicle function control file comprising a secure fob key and a profile template defining vehicle access and/or function control data;
- wherein the processor is configured to authenticate the new device via the secure fob key, and, based on the authentication, apply a profile template associated with the secure fob key to a vehicle subsystem to at least one of (i) limit access of the new device to the vehicle, (ii) limit an operational function of the vehicle, and (iii) provide alerts for the vehicle based on the vehicle access and/or function control data.

16. The vehicle of claim 15, wherein the profile template associated with the vehicle access/function control data comprises at least one of vehicle access control data, sensor control data, vehicle function control data, alerts/messaging data and entertainment system control data.

17. The vehicle of claim 15, wherein the vehicle function control file is configured to expire after a predetermined period of time.

18. The vehicle of claim 17, wherein the processor is configured to execute the vehicle function control file, for obtaining at least one of the following configurations for the vehicle:
- the vehicle access control data is configured to limit a time in which the vehicle is accessed via the new device;
- the sensor control data is configured to control a sensor parameter in the vehicle;
- the vehicle function control data is configured to control vehicle function and/or performance in the vehicle;
- the alerts/messaging data is configured to provide alerts and/or messages associated with the vehicle access/function control data in the vehicle; and/or
- the entertainment system control data is configured to control at least one function of the entertainment system in the vehicle.

19. The vehicle of claim 15, wherein the fob key comprises identification data associated with the new device.

20. The vehicle of claim 15, wherein the profile template is further configured to provide alerts for the vehicle based on the vehicle access and/or function control data.

* * * * *